(12) United States Patent
Cheng et al.

(10) Patent No.: US 10,098,060 B2
(45) Date of Patent: *Oct. 9, 2018

(54) DEVICE, NETWORK, AND METHOD OF CELL DISCOVERY

(71) Applicant: Futurewei Technologies, Inc., Plano, TX (US)

(72) Inventors: Qian Cheng, Aurora, IL (US); Weimin Xiao, Hoffman Estates, IL (US); Jialing Liu, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/421,924

(22) Filed: Feb. 1, 2017

(65) Prior Publication Data

US 2017/0150427 A1 May 25, 2017

Related U.S. Application Data

(63) Continuation of application No. 14/611,070, filed on Jan. 30, 2015, now Pat. No. 9,749,938.

(Continued)

(51) Int. Cl.
*H04W 4/00* (2018.01)
*H04W 48/16* (2009.01)
(Continued)

(52) U.S. Cl.
CPC ......... *H04W 48/16* (2013.01); *H04J 11/0069* (2013.01); *H04L 5/00* (2013.01);
(Continued)

(58) Field of Classification Search
CPC . H04W 48/16; H04W 72/0453; H04W 24/08; H04W 48/08; H04J 11/0069; H04L 5/00
(Continued)

(56) References Cited

U.S. PATENT DOCUMENTS 9,749,938 B2 * 8/2017 Cheng ................... H04W 48/16
2010/0260169 A1 10/2010 Gheorghiu et al.
(Continued)

FOREIGN PATENT DOCUMENTS

WO 2011066325 A1 6/2011
WO 2011123809 A1 10/2011

OTHER PUBLICATIONS

"Discussion on Small Cell on/off Transition Time Reduction Procedure," Source: Panasonic, Agenda Item: 6.2.6.2, Document for: Discussion and Decision, 3GPP TSG RAN WG1 Meeting #75, R1-135397, Nov. 11-15, 2013, 4 pages.

(Continued)

*Primary Examiner* — Chi H Pham
*Assistant Examiner* — Alexander O Boakye
(74) *Attorney, Agent, or Firm* — Slater Matsil, LLP

(57) ABSTRACT

System and method embodiments are provided for network cell discovery. In an embodiment, a method in a mobile device includes receiving, at the mobile device, at least one parameter from a first network component, wherein the at least one parameter is associated with a discovery signal (DS) generated by and transmitted from a second network component, wherein the parameter specifies a time period between successive transmissions of the DS, an offset within the time period, and a duration of each transmission of the DS; receiving, at the mobile device, according to the time period and the offset, the DS from the second network component; and suspending reception on a first carrier radio resource during a gap in successive transmissions on the first carrier radio resource and receiving a signal on a second carrier radio resource during the gap, wherein the gap is determined according to the parameter.

48 Claims, 19 Drawing Sheets

Related U.S. Application Data

(60) Provisional application No. 61/934,550, filed on Jan. 31, 2014.

(51) Int. Cl.
*H04L 5/00* (2006.01)
*H04J 11/00* (2006.01)
*H04W 24/10* (2009.01)
*H04W 72/04* (2009.01)
*H04W 52/02* (2009.01)

(52) U.S. Cl.
CPC ............ *H04L 5/005* (2013.01); *H04W 24/10* (2013.01); *H04W 72/0446* (2013.01); *H04L 5/0091* (2013.01); *H04W 52/0206* (2013.01); *Y02D 70/00* (2018.01); *Y02D 70/1262* (2018.01); *Y02D 70/142* (2018.01); *Y02D 70/144* (2018.01)

(58) Field of Classification Search
USPC ......................................................... 370/329
See application file for complete search history.

(56) References Cited

U.S. PATENT DOCUMENTS

| | | |
|---|---|---|
| 2012/0020310 A1 | 1/2012 | Ji et al. |
| 2012/0149351 A1 | 6/2012 | Kalbag |
| 2012/0213109 A1 | 8/2012 | Xu et al. |
| 2013/0079048 A1 | 3/2013 | Cai et al. |
| 2014/0016488 A1 | 1/2014 | Xu et al. |
| 2014/0036737 A1 | 2/2014 | Ekpenyong et al. |
| 2014/0171073 A1 | 6/2014 | Kim et al. |
| 2015/0023191 A1 | 1/2015 | Kim et al. |

OTHER PUBLICATIONS

"Small Cell Semi-Static on/off with a Discovery Signal," Agenda Item: 6.2.6.2, Source: Broadcam Corporation, Document for: Discussion and Decision, 3GPP TSG-RAN WG1 Meeting #75, R1-135539, Nov. 11-15, 2013, 4 pages.

"Indication of Cell Trasmission to UEs," Source: Hitachi Ltd., Agenda Item: 6.2.3.2.1, Document for: Discussion/Decision, 3GPP TSG-RAN WG1 #77, R1-142248, May 19-23, 2014, 4 pages.

"3rd Generation Partnership Project; Technical Specification Group Radio Access Network; Evolved Universal Terrestrial Radio Access (E-UTRA); Pyhsical Channels and Modulation, (Release 12)," 3GPP TS 36.211, V12.4.0, Dec. 2014, 124 pages.

"3rd Generation Partnership Project; Technical Specification Group Radio Access Network; Evolved Universal Terrestrial Radio Access (E-UTRA); Physical Layer Procedures, (Release 12)," 3GPP TS 36.213, V12.4.0, Dec. 2014, 225 pages.

"3rd Generation Partnership Project; Technical Specification Group Radio Access Network; Evolved Universal Terrestrial Radio Access (E-UTRA) and Evolved Universal Terrestrial Radio Access Network; (E-UTRAN); Overall Description; Stage 2, (Release 12)," 3GPP TS 36.300, V12.4.0, Dec. 2014, 251 pages.

"3rd Generation Partnership Project; Technical Specification Group Radio Access Network; Evolved Universal Terrestrial Radio Access (E-UTRA); Radio Resource Control (RRC); Protocol Specification, (Release 12)," 3GPP TS 36.331, V12.4.1, Dec. 2014, 410 pages.

"Small Cell Discovery for Efficient Small Cell On/Off Operation," Source: NTT DOCOMO, Agenda Item: 7.2.6.1.2, Document for: Discussion and Decision, 3GPP TSG RAN WG1 Meeting #74, R1-133457, Barcelona, Spain, Aug. 19-23, 2013, 8 pages.

"Small Cell On/Off Mechanism and Discovery Signal," Agenda Item: 6.2.6.2, Source: NEC, Document for: Discussion, 3GPP TSG RAN WG1 Meeting #75, R1-135262, San Francisco, USA, Nov. 11-15, 2013, 6 pages.

"Discussion on RRM Measurement Procedures in Small Cell On/Off Operation," Agenda Item: 6.2.3.2.4, Source: Sony, Document for: Discussion, 3GPP TSG RAN WG1 Meeting #77, R1-142474, Seoul, Korea, Mar. 19, 2014 through Apr. 23, 2014, 6 pages.

"Discussion on Network Assistance Signaling for Small Cell Discovery," Agenda Item: 7.2.1.2.3, Source: Huawei, HiSilicon, Document for: Discussion/Decision, 3GPP TSG RAN WG1 Meeting #78, R1-142828, Dresden, Germany, Aug. 18-22, 2014, 6 pages.

* cited by examiner

DEVICE, NETWORK, AND METHOD OF CELL DISCOVERY

This application is a continuation of U.S. application Ser. No. 14/611,070, filed Jan. 30, 2015 which claims the benefit of U.S. Provisional Application No. 61/934,550, filed on Jan. 31, 2014, which applications are hereby incorporated by reference.

TECHNICAL FIELD

The present invention relates to a device, network, and method for wireless communications, and, in particular embodiments, to a device and method utilizing a downlink discovery reference signal for cell discovery.

BACKGROUND

The amount of wireless data being transferred is expected to exceed that of wired data, pushing the limits of macro cell deployment. Small cell deployment may be used to help handle this increase in data capacity, while meeting customer quality of service expectations and operators' requirements for cost-effective service delivery.

Small cells generally are low-power wireless access points that operate in a licensed spectrum. Small cells provide improved cellular coverage, capacity and applications for homes and businesses, as well as metropolitan and rural public spaces. Different types of small cells include, generally from smallest size to largest size, femtocells, picocells, metrocells and microcells.

SUMMARY

In an embodiment, a method in a mobile device for communicating with a network node in a wireless cellular network includes receiving, at the mobile device, at least one parameter from a first network component, wherein the at least one parameter is associated with a discovery signal (DS) generated by and transmitted from a second network component, wherein the parameter specifies a time period between successive transmissions of the DS, an offset within the time period, and a duration of each transmission of the DS; receiving, at the mobile device, according to the time period and the offset, the DS from the second network component; and suspending reception on a first carrier radio resource during a gap in successive transmissions on the first carrier radio resource and receiving a signal on a second carrier radio resource during the gap, wherein the gap is determined according to the parameter.

In an embodiment, a method in a network component for communicating with user equipment (UEs) includes receiving, at the network component, at least one discovery signal (DS) transmission parameter wherein the at least one DS transmission parameter specify a time period between successive transmission of the DS and a duration of each DS transmission; generating, by the network component, a DS according to the DS transmission parameters; and periodically transmitting, by the network component, the DS to the UE at a period and a duration determined according to the at least one DS transmission parameter, wherein the DS enables the UE to make radio resource management (RRM) measurements according to the DS, wherein the DS is transmitted during both an off state and an on state of the network component, wherein only the DS is transmitted by the network component when the network component is in the off state, wherein the DS is transmitted not more frequently than once every other subframe, and wherein the time period between successive transmissions of the DS is longer than a time period between successive transmissions of a common reference signal (CRS).

In an embodiment, a mobile device for communicating with a network node in a wireless cellular network includes a transmitter; a receiver; a processor; and a computer readable storage medium storing programming for execution by the processor, the programming including instructions to: receive at least one parameter from a first network component, wherein the at least one parameter is associated with a discovery signal (DS) generated by and transmitted from a second network component, wherein the parameter specifies a time period between successive transmissions of the DS, an offset within the time period, and a duration of each transmission of the DS; receive, according to the time period and the offset, the DS from the second network component; and suspend reception on a first carrier radio resource during a gap in successive transmissions on the first carrier radio resource and receiving a signal on a second carrier radio resource during the gap, wherein the gap is determined according to the parameter.

In an embodiment, a network component configured communicating with user equipment (UEs) includes a transmitter; a receiver; a processor; and a computer readable storage medium storing programming for execution by the processor, the programming including instructions to: receive at least one discovery signal (DS) transmission parameter wherein the at least one DS transmission parameter specify a time period between successive transmission of the DS and a duration of each DS transmission; generate a DS according to the DS transmission parameters; and periodically transmit the DS to the UE at a period and a duration determined according to the at least one DS transmission parameter, wherein the DS enables the UE to make radio resource management (RRM) measurements according to the DS, wherein the DS is transmitted during both an off state and an on state of the network component, wherein only the DS is transmitted by the network component when the network component is in the off state, wherein the DS is transmitted not more frequently than once every other subframe, and wherein the time period between successive transmissions of the DS is longer than a time period between successive transmissions of a common reference signal (CRS).

BRIEF DESCRIPTION OF THE DRAWINGS

For a more complete understanding of the present invention, and the advantages thereof, reference is now made to the following descriptions taken in conjunction with the accompanying drawing, in which:

FIG. 18 illustrates an embodiment example of frame structure for SDS with 5 ms periodicity;

DETAILED DESCRIPTION OF ILLUSTRATIVE EMBODIMENTS

Figure 1:
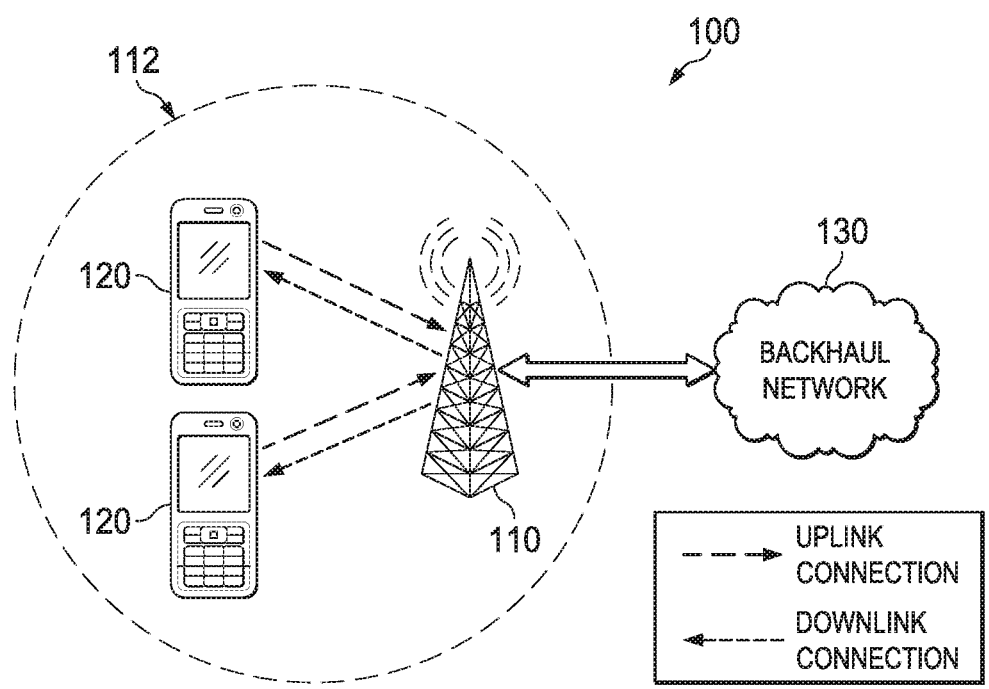
FIG. 1 illustrates downlink and uplink transmission.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Typically, in a modern wireless communications system, such as a Third Generation Partnership Project (3GPP) Long Term Evolution (LTE) compliant communications system, a plurality of cells or evolved NodeBs (eNB) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may be serving a number of users (also commonly referred to as User Equipment (UE), mobile stations, users, subscribers, terminals, and so forth) based on a priority metric, such as fairness, proportional fairness, round robin, and the like, over a period of time. It is noted that the terms cell, transmission points, and eNB may be used interchangeably. Distinction between cells, transmission points, and eNBs will be made where needed.

In legacy systems, a common reference signal (CRS) is transmitted in every subframe from a cell (e.g., an eNB). A UE monitors the CRS in every subframe. Many operations are built upon these assumptions. A missing CRS (e.g., the cell is turned off and not broadcasting the CRS) can cause unknown UE behavior. In some instances, it may cause the UE to disconnect or abort data transmission/reception. However, it has been found transmission of the CRS and other signals by a cell can cause unwanted interference in some UEs or other devices in the network. Consequently, disclosed herein is a system and method for suspending transmission of the CRS and other signals in certain circumstances. In order to prevent unwanted UE behavior, a network controller signals the UE when to expect the CRS and when not to expect the CRS. The network controller also instructs the UE to expect a discovery signal (DS) from a cell. The DS provides some of the features of the CRS, but is transmitted much less frequently. Thus, a cell can be turned off when not needed and only the transmission of the DS is performed during the off state. This has been found to significantly reduce interference experienced by other devices in the network as well as save power in the cell node (e.g., eNB).

Thus, disclosed herein is a DS (also referred to as a discovery reference signal (DRS) and the two terms are used interchangeably throughout this disclosure) that is not transmitted in every subframe, but only once in a while. In some embodiments, the DS is transmitted periodically. The instances in which the DS is transmitted are DS bursts (also referred to as DS occasions). A DS burst is indicated in a discovery measurement timing configuration (DMTC). A network controller in the network signals configuration parameters to the UE regarding when to expect a DS and other information about the DS. The timing information includes a time period between successive transmissions of the DS, on offset of the DS within that time period. The configuration parameters sent to the UE may also include activation/deactivation signaling instructing the UE when to expect the CRS from the cell. The UE refrains from attempting to perform CRS based processes during times when no CRS is received. In an embodiment, the UE refrains from attempting to perform CRS based processes during times in which the cell is inactive for the UE and only performs CRS based processes during the activation period for the cell. Based on the time between successive transmission of the DS, the offset, and/or the duration of the DS, the UE may suspend reception of signals on one carrier resource and receive signals on a different carrier resource. The reception of the signals on the different carrier resource may occur in a gap in transmissions on the first carrier resource. For example, during a gap in receiving the DS, the UE may suspend reception on the carrier radio resource on which the DS is received and receive signals on a different carrier radio resource. The UE may perform measurements or other procedures on the signals received on the different carrier radio resource. In another example, based on the time period between successive transmission of the DS and the offset within the time period, the UE may suspend reception of signaling on a first carrier radio resource and begin reception of the DS on a different second carrier radio resource during the gap in reception of the signaling on the first carrier radio resource.

Disclosed herein is an embodiment of a method in a mobile device (e.g., UE) for communicating with a network node in a wireless cellular network includes receiving, at the mobile device, at least one parameter from a first network component, wherein the at least one parameter is associated with a discovery signal (DS) generated by and transmitted from a second network component, wherein the parameter specifies a time period between successive transmissions of the DS, an offset within the time period, and a duration of each transmission of the DS; receiving, at the mobile device, according to the time period and the offset, the DS from the second network component; and suspending reception on a first carrier radio resource during a gap in successive transmissions on the first carrier radio resource and receiving a signal on a second carrier radio resource during the gap, wherein timing of the gap is determined so as to avoid a time of a DS burst. In an embodiment, the DS is transmitted on the first carrier radio resource and wherein suspending reception includes suspending reception on the first carrier radio resource during a gap between successive DS receptions and performing a measurement on a signal received on second carrier radio resource. In another embodiment, the DS is transmitted on the second carrier radio resource and suspending reception includes suspending reception on the first carrier radio resource and receiving and performing measurements on the DS on the second carrier radio resource during a gap between successive signal receptions on the first carrier radio resource. The time period is at least 40 milliseconds and the duration is about 5 milliseconds. The DS may be transmitted in a DS burst. The configuration parameter provides the mobile device with an active time frame within which the mobile device is to expect a common reference signal (CRS) from a network component, a deactivation time frame within which the mobile device is not to expect the CRS, and information for receiving and processing the DS from the second network component. The DS is generated by the network component according to a set of DS transmission parameters associated with the parameter. The UE refrains from performing CRS based procedures when the CRS is not received. The UE processes the DS according to configuration parameter(s). The time period between successive transmissions of the DS is longer than a time period between successive transmissions of a common reference signal (CRS). In an embodiment, the UE also receives parameters associated with a DS for a third network component from the first network component and determines quasi-co-location between antenna ports of the second network component and antenna ports of the third network component according to the configuration parameters that indicate the quasi-co-location between the second network component and the third network component. In an embodiment, the UE performs a DS based action according to the DS and the parameters, wherein the DS based action includes at least one of synchronization, cell identification, and DS based radio resource management (RRM) measurements according to the DS and transmits a report of the DS based action to the first network component. In an embodiment, DS is transmitted on the second carrier radio resource and wherein the suspending reception comprises suspending reception on the first carrier radio resource and receiving and performing measurements on the DS on the second carrier radio resource during a gap between successive signal receptions on the first carrier radio resource, wherein the gap has a same periodicity and offset as the DS and the duration of the gap is longer than the DS duration, and wherein the gap completely contains the DS duration. In an embodiment, the UE receives parameters associated with a DS for a third network component from the first network component and determining quasi-co-location between a set of specified antenna ports of the second network component and a set of specified antenna ports of the third network component according to the parameters that indicate the quasi-co-location between the second network component and the third network component. In some embodiments, the second network component and the third network component are the same network component.

Also disclosed herein is a method in a network component for communicating with user equipment (UEs) includes receiving, at the network component, at least one discovery signal (DS) transmission parameter wherein the at least one DS transmission parameter specify a time period between successive transmission of the DS and a duration of each DS transmission; generating, by the network component, a DS according to the DS transmission parameters; and periodically transmitting, by the network component, the DS to the UE at a period and a duration determined according to the at least one DS transmission parameter, wherein the DS enables the UE to make radio resource management (RRM) measurements according to the DS, wherein the DS is transmitted during both an off state and an on state of the network component, wherein only the DS is transmitted by the network component when the network component is in the off state, wherein the DS is transmitted not more frequently than once every other subframe, and wherein the time period between successive transmissions of the DS is longer than a time period between successive transmissions of a common reference signal (CRS). The time period between successive transmissions of the DS is at least 40 milliseconds. In an embodiment, the DS is transmitted in a DRS burst and the duration of the DS burst is about 5 milliseconds. The DRS burst may include multiple subframes. The network component may suspend transmission of the CRS during inactivation states responsive to signaling from a network controller.

FIG. 1 illustrates a network 100 for communicating data. The network 100 comprises an access point (AP) no having a coverage area 112, a plurality of user equipment (UEs) 120, and a backhaul network 130. As used herein, the term AP may also be referred to as a transmission point (TP) and the two terms may be used interchangeably throughout this disclosure. The AP 110 may comprise any component capable of providing wireless access by, inter alia, establishing uplink (dashed line) and/or downlink (dotted line) connections with the UEs 120, such as a base station transceiver (BST), an enhanced base station (eNB), a femtocell, and other wirelessly enabled devices. The UEs 120 may comprise any component capable of establishing a wireless connection with the AP no. The backhaul network 130 may be any component or collection of components that allow data to be exchanged between the AP no and a remote end (not shown). In some embodiments, the network 100 may comprise various other wireless devices, such as relays, femtocells, etc. As shown in FIG. 1, the transmission/reception from controller to a UE is called downlink (DL) transmission/reception, and the transmission/reception from a UE to a controller is called uplink (UL) transmission/reception.

In Orthogonal frequency-division multiplexing (OFDM) systems, the frequency bandwidth is divided into multiple subcarriers in frequency domain. In time domain, one subframe is divided into multiple OFDM symbols. The OFDM symbol may have cyclic prefix to avoid the inter-symbol interference due to multiple path delays. One resource element (RE) is defined by the time-frequency resource within one subcarrier and one OFDM symbol. A reference signal and other signals, such as data channel, e.g. physical downlink shared channel (PDSCH), and control channel, e.g. physical downlink control channel (PDCCH), are orthogonal and multiplexed in different resource elements in time-frequency domain. Further, the signals are modulated and mapped into resource elements. Using inverse Fourier transform per each OFDM symbol, the signals in frequency domain are transformed into the signals in time domain, and are transmitted with added cyclic prefix to avoid the inter-symbol interference.

Figure 2:
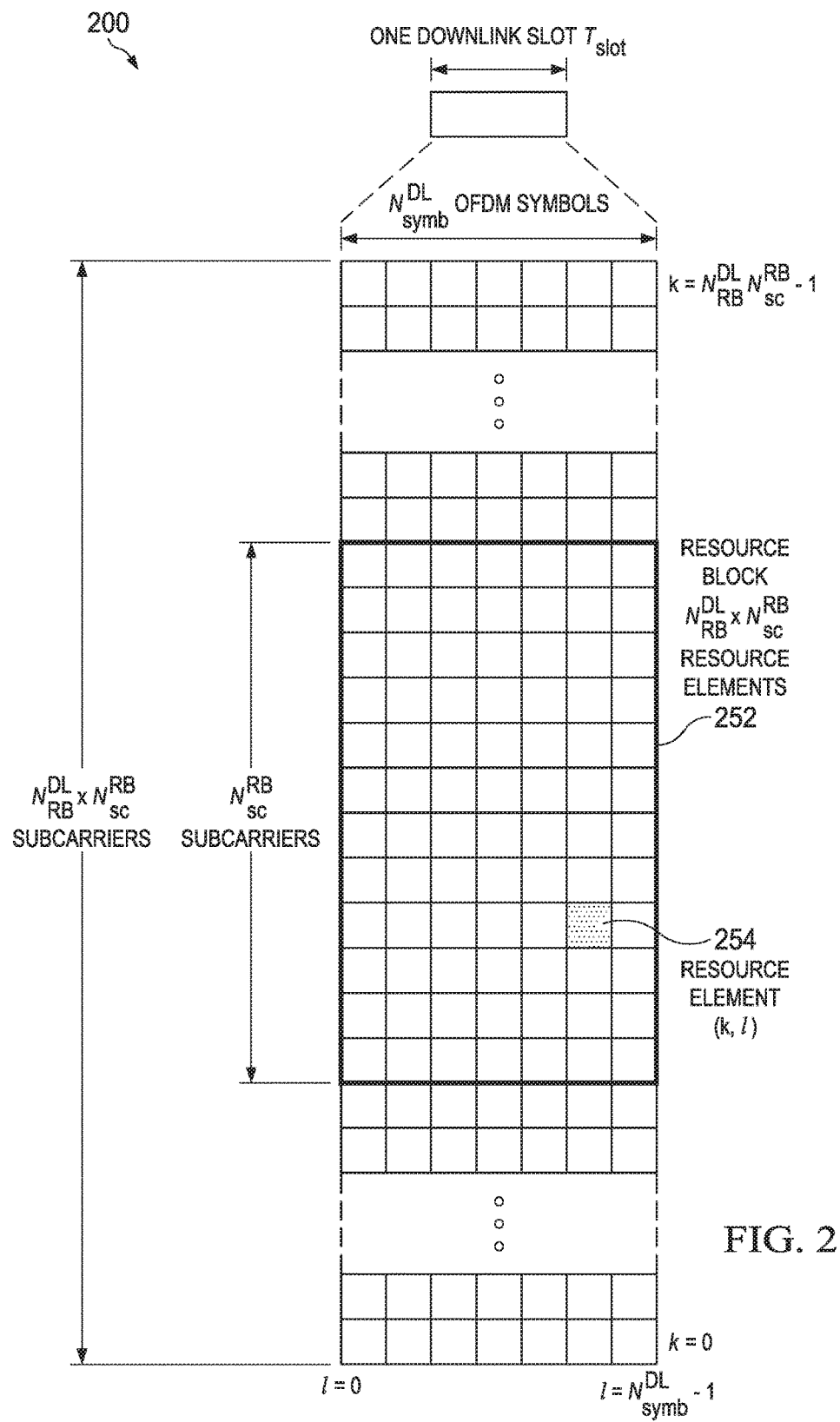
FIG. 2 illustrates an embodiment example of OFDM symbols with normal cyclic prefix (CP)

FIG. 2 illustrates an example embodiment of OFDM symbols 200 with normal cyclic prefix (CP). Each resource block (RB) 252 contains a number of resource elements (Res) 254. There are 14 OFDM symbols labeled from 0 to 13 in each subframe. The symbols 0 to 6 in each subframe correspond to even slots, and the symbols 7 to 13 in each subframe correspond to odd slots. In the figure, only one slot of a subframe is shown. There are 12 subcarriers labeled from 0 to 11 in each RB 252, and hence in this example, there are 132 REs 254 in a RB 252. In each subframe, there are a number of RBs 252, and the number may depend on the bandwidth (BW).

Figure 3:
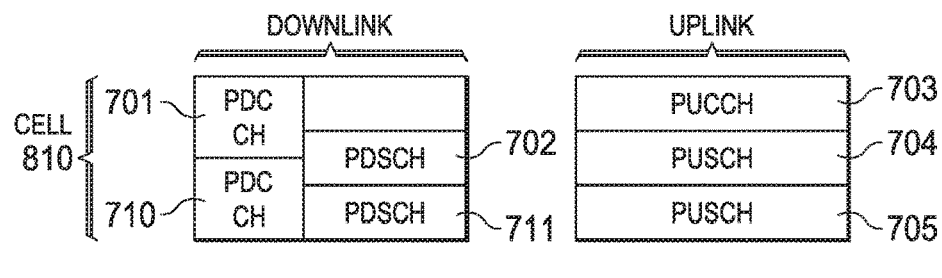
FIG. 3 illustrates an embodiment example of physical data and control channels.

FIG. 3 illustrates an embodiment example of physical data and control channels. As shown in FIG. 3, the data channels transmitting data packets from eNB to UEs in physical layer are called physical downlink shared channel (PDSCH) 702, 711, and the data channel transmitting data packet from UEs to eNB in physical layer are called physical uplink shared channel (PUSCH) 703, 704, 705. The corresponding physical control channels transmitted from eNB to UEs in cell 810, indicate where the corresponding PDSCH 702, 711 and/or PUSCH 703, 704, 705 is in frequency domain and in which manner the PDSCH 702, 711 and/or PUSCH 703, 704, 705 is transmitted, which are called physical downlink control channel (PDCCH) 701, 710. In FIG. 3, PDCCH 701 may indicate the signaling for PDSCH 702 or PUSCH 704. PDCCH 710 may indicate the signaling for PDSCH 711 or PUSCH 705. In Release 11, the enhanced PDCCH (EPDCCH) is a downlink control channel to have a similar functionality as PDCCH, but the transmission of EPDCCH may be in the data region of an LTE Rel-8 system, and EPDCCH demodulation is based on the DMRS as opposed to CRS-based demodulation for PDCCH.

Figure 4:
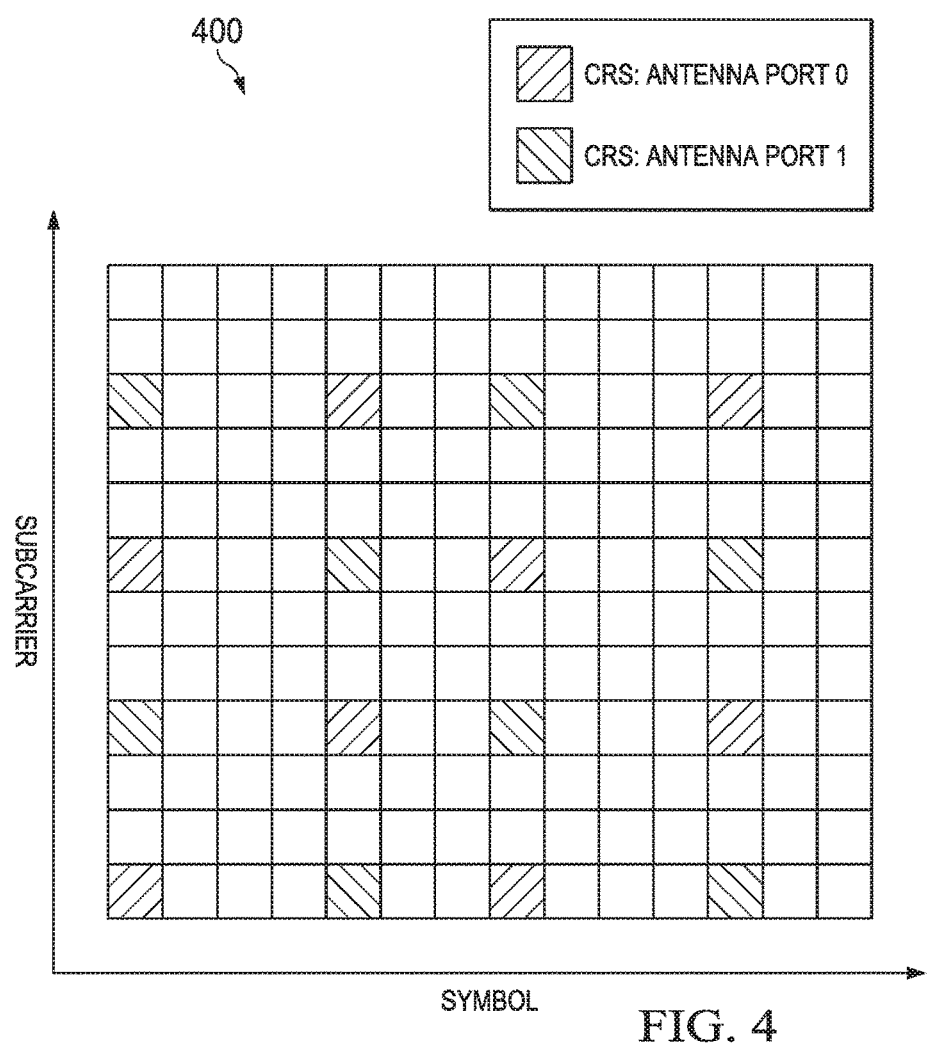
FIG. 4 illustrates an embodiment example of common reference signal (CRS)

FIG. 4 illustrates an embodiment example of common reference signal (CRS) 400. In downlink transmission of LTE-A system, there is reference signal for UE to perform channel estimation for demodulation of physical downlink control channel (PDCCH) and other common channels as well as for measurement and some feedbacks, which is common/cell-specific reference signal (CRS) inherited from the Rel-8/9 specification of E-UTRA, as shown in FIG. 4.

Dedicated/de-modulation reference signal (DMRS) can be transmitted together with the physical downlink shared channel (PDSCH) channel in Rel-10 of E-UTRA. DMRS is used for channel estimation during PDSCH demodulation. DMRS can also be transmitted together with EPDCCH for the channel estimation of EPDCCH by the UE.

Figure 5:
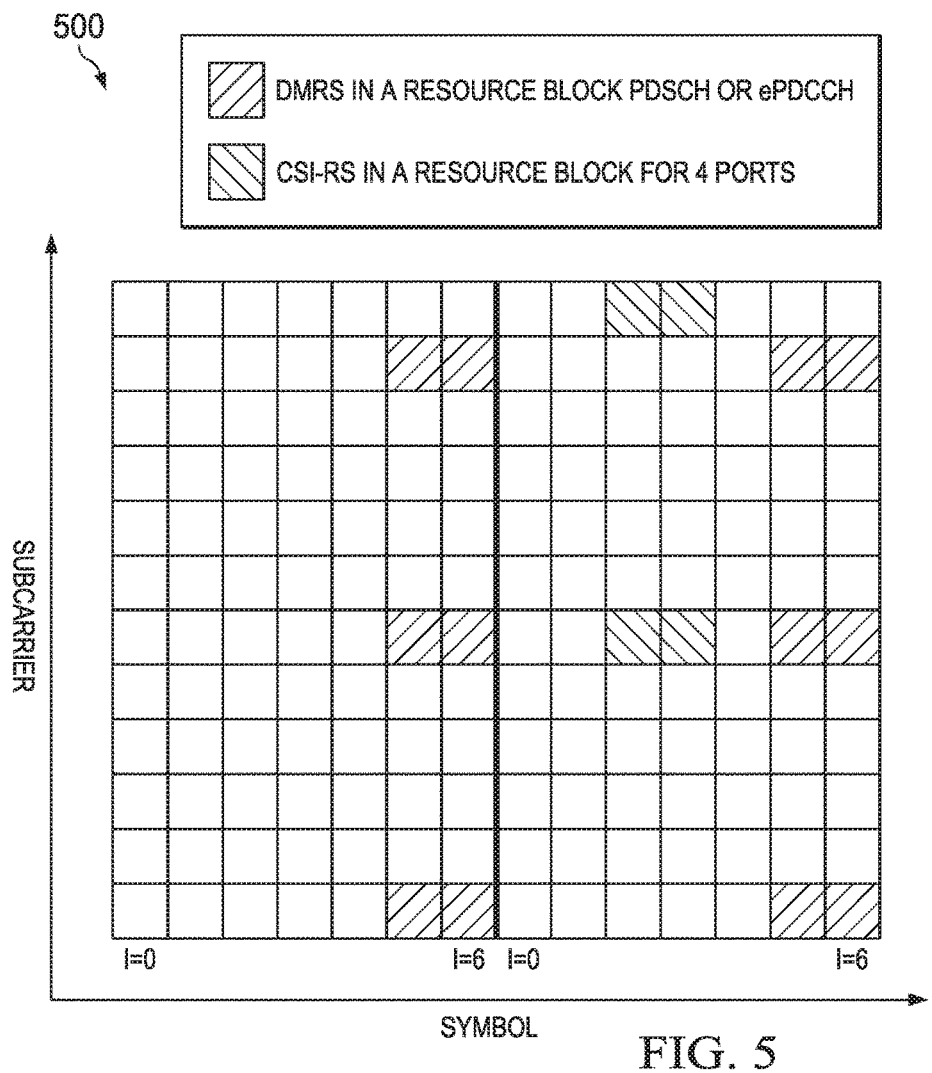
FIG. 5 illustrates an embodiment example of CSI-RS and DMRS.

FIG. 5 illustrates an embodiment example of CSI-RS and DMRS 500. In Rel-10, channel status indicator reference signal (CSI-RS) is introduced in addition to CRS (common reference signal) and DMRS (dedicated demodulation reference signal), as shown in FIG. 5. CSI-RS is used for Rel-10 UEs to measure the channel status, especially for multiple antennas cases. PMI/CQI/RI and other feedbacks may be based on the measurement of CSI-RS for Rel-10 and beyond UE. PMI is the precoding matrix indicator, and CQI is the channel quality indicator, and RI is the rank indicator of the precoding matrix. There may be multiple CSI-RS resources configured for a UE. There is specific time-frequency resource and scrambling code assigned by the eNB for each CSI-RS resource.

Figure 6:
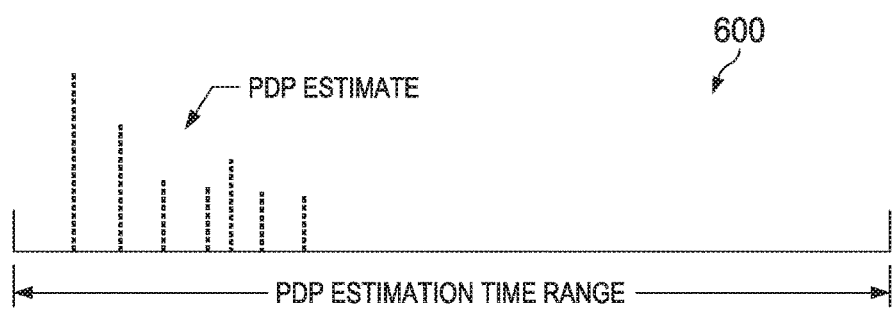
FIG. 6 illustrates an embodiment example of channel PDP estimate.

FIG. 6 illustrates an embodiment example of channel PDP estimate 600. Reference signal (RS e.g. CRS, CSI-RS or DMRS) may be used for a receiver to estimate the channel impulse response and/or channel power delay profile (PDP). RS is typically pseudorandom sequence QPSK modulated on the subcarriers assigned for RS transmission. Upon receiving the RS, receiver performs demodulation and descrambling by multiply the conjugate of the pseudorandom sequence. The resulting signal is then transformed into time domain by IFFT operation to obtain the channel PDP estimation. Further measurements may be performed based on the obtained PDP estimates. FIG. 6 illustrates example of channel PDP estimate obtained from the above mentioned processing of RS. For different tone spacings (i.e. subcarrier spacings), the illustrated PDP estimation time range may take different values. For example, the RS occupies contiguous tones in an OFDM symbol, the time range is equal to the symbol duration; if the RS uniformly occupies one tone out of every 6 tones in an OFDM symbol, the time range is equal to one sixth of the symbol duration. RS from different transmitters may be assigned to different sets of subcarriers and hence are separated in frequency domain. RS from different transmitters may also be assigned to different pseudorandom sequences and hence are separated via low correlation between the pseudorandom sequences. However, RS may also be assigned to transmit on the same set of subcarriers and using the same pseudorandom sequence. In these cases, the RS can strongly interfere with each other. In current LTE systems, generally the use of the same pseudorandom sequence in RSs for different cells on the same set of time/frequency resources is done only if the cells are far apart from each other so that the RS interference may be reduced to an allowable range. Generally this is considered at the network planning.

A heterogeneous network (HetNet) may include a macro cell and a pico cell, or generally a higher power node/antenna with a larger coverage and lower power node/antennas with a smaller coverage. Lower power nodes (or lower power points, picos, femtos, micros, relay nodes, remote radio heads, remote radio units, distributed antennas, etc.) generally are low-power wireless access points that operate in a licensed spectrum. Lower power nodes provide improved cellular coverage, capacity and applications for homes and businesses, as well as metropolitan and rural public spaces.

In the 3GPP Rel-10 specification, a component carrier is called a cell. When multiple cells are controlled by a same eNodeB, cross scheduling of multiple cells is possible to be implemented because there may be a single scheduler in the same eNodeB to schedule the multiple cells. With carrier aggregation (CA), one eNB may operate and control several component carriers forming Pcell and Scell. In Rel-11 design, an eNodeB may control both a Macro cell and a Pico cell. In this case, the backhaul between the Macro cell and the Pico cell is fast backhaul. The eNodeB can control the transmission/reception of both macro cell and Pico cell dynamically. The PDCCH or EPDCCH transmitted from the macro cells (or points) can be used to indicate the PDSCH or PUSCH transmitted from the Pico cell (or points).

Usually, the eNBs may be arranged close to each other so that a decision made by a first eNB may have an impact on a second eNB. For example, the eNBs may use their transmit antenna arrays to form beams towards their UEs when serving them. This may mean that if the first eNB decides to serve a first UE in a particular time-frequency resource, it may form a beam pointing to that UE. However, the pointed beam may extend into a coverage area of the second eNB and cause interference to UEs served by the second eNB. The inter-cell interference (ICI) for small cell wireless communications systems is commonly referred to as an interference limited cell scenario, which may be different from a noise limited cell scenario seen in large cell wireless communications systems.

In Rel-12 or beyond design, the backhaul between the Macro cell and the Pico cell may not be fast backhaul. In other words, the backhaul may be slow backhaul, or any backhaul. In slow backhaul scenario, generally the PDCCH or EPDCCH transmitted from the macro cells (or points) cannot be used to indicate the PDSCH or PUSCH transmitted from the Pico cell (or points).

In one network embodiment, there may be multiple Macro points and multiple Pico points operating in multiple component carriers, and the backhaul between any two points can be fast backhaul or slow backhaul depending on the deployment. When two points have fast backhaul, the fast backhaul may be fully utilized, e.g., to simplify the communication method and system or to improve coordination. In this network, the points configured for a UE for transmission or reception may include multiple points, some pairs of points may have fast backhaul, but some other pairs of points may have slow backhaul or any backhaul.

In one deployment, an eNodeB may control one or more cells. Multiple remote radio units may be connected to the same base band unit of the eNodeB by fiber cable, and the latency between base band unit and remote radio unit is quite small. Therefore the same base band unit can process the coordinated transmission/reception of multiple cells. For example, the eNodeB may coordinate the transmissions of multiple cells to a UE, which is called coordinated multiple point (CoMP) transmission. The eNodeB may also coordinate the reception of multiple cells from a UE, which is called CoMP reception. In this case, the backhaul link between these cells with the same eNodeB is fast backhaul and the scheduling of PDSCH transmitted in different cells for the UE can be easily coordinated in the same eNodeB.

As an extension of the HetNet deployment, possibly densely deployed small cells using low power nodes are considered promising to cope with mobile traffic explosion, especially for hotspot deployments in indoor and outdoor scenarios. A low-power node generally means a node whose transmission power is lower than macro node and BS classes, for example Pico and Femto eNB are both applicable. Small cell enhancements for E-UTRA and E-UTRAN, which is an ongoing study in 3GPP, will focus on additional functionalities for enhanced performance in hotspot areas for indoor and outdoor using possibly densely deployed low power nodes.

Figure 8:
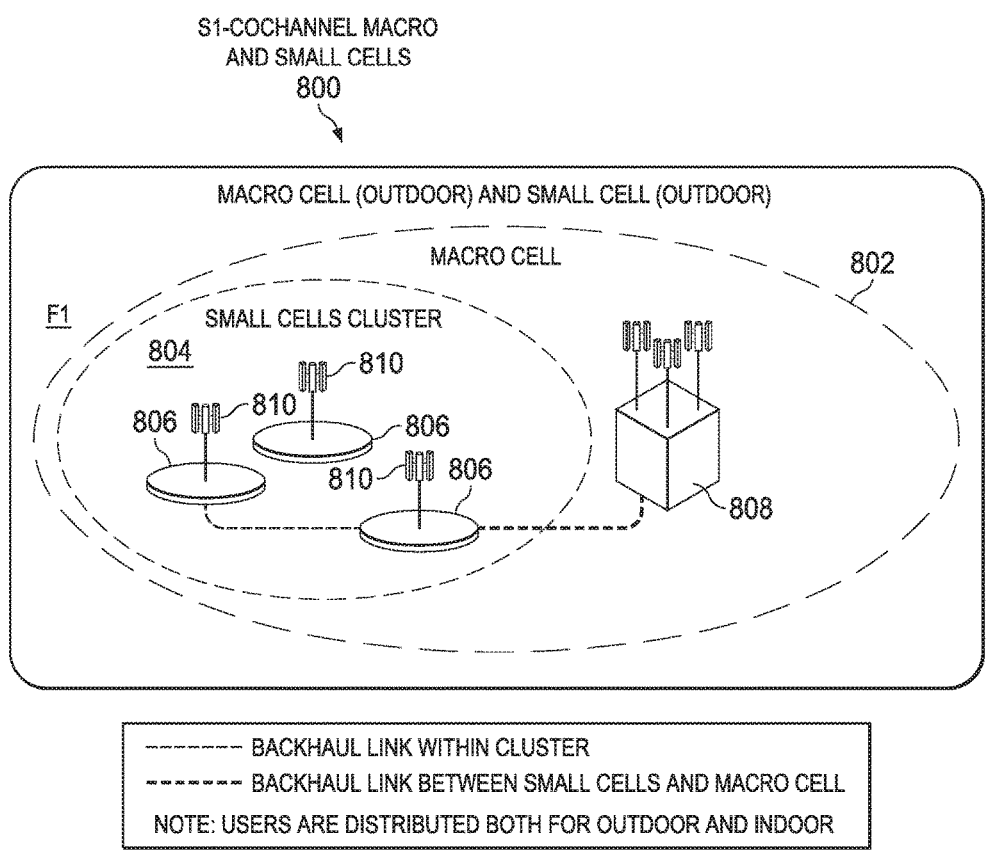
FIG. 8 illustrates a an embodiment of a system of co-channel macro and small cells.
Figure 9A:
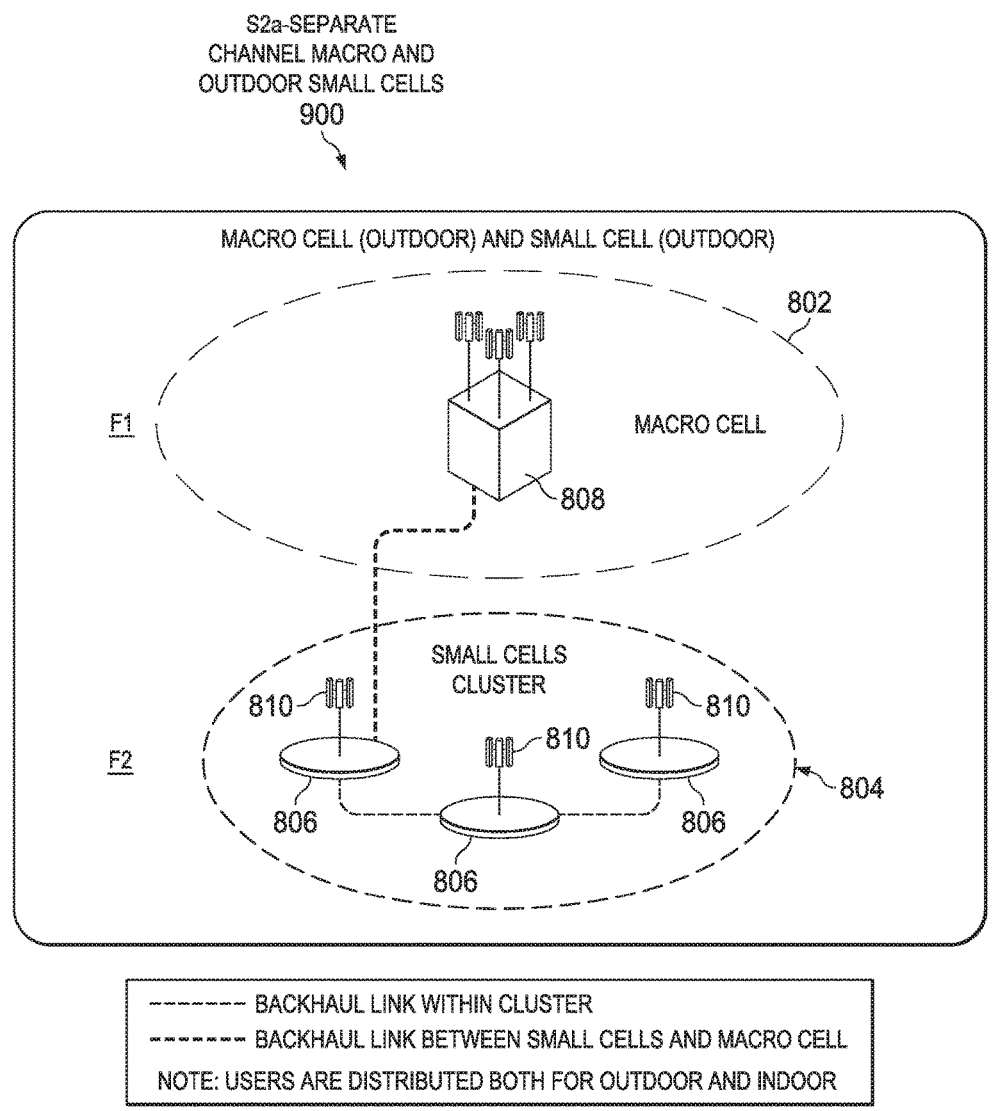
FIG. 9A illustrates an embodiment of a separate channel macro and outdoor small cells.
Figure 9B:
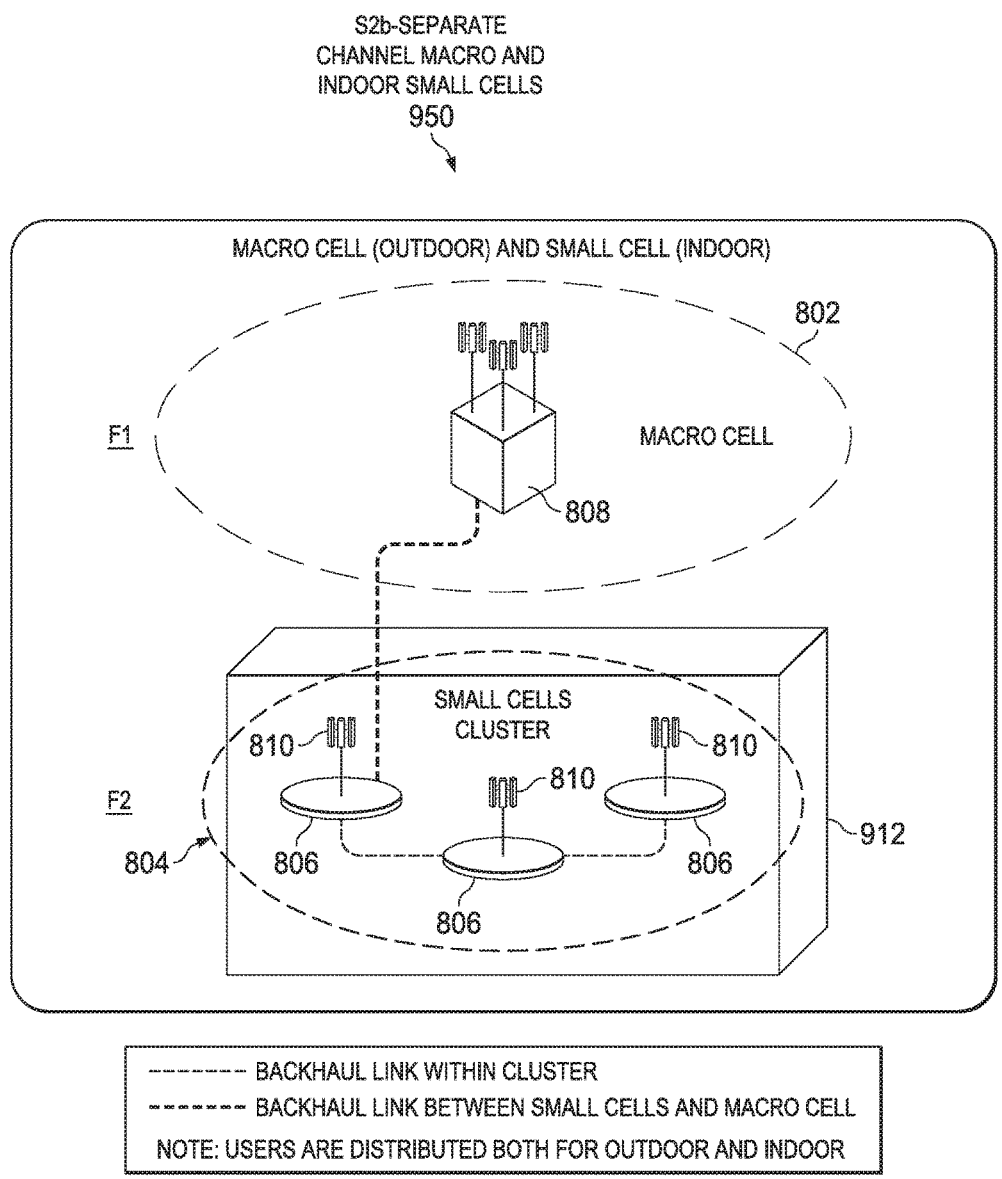
FIG. 9B illustrates an embodiment of a separate channel macro and indoor small cells.
Figure 10:
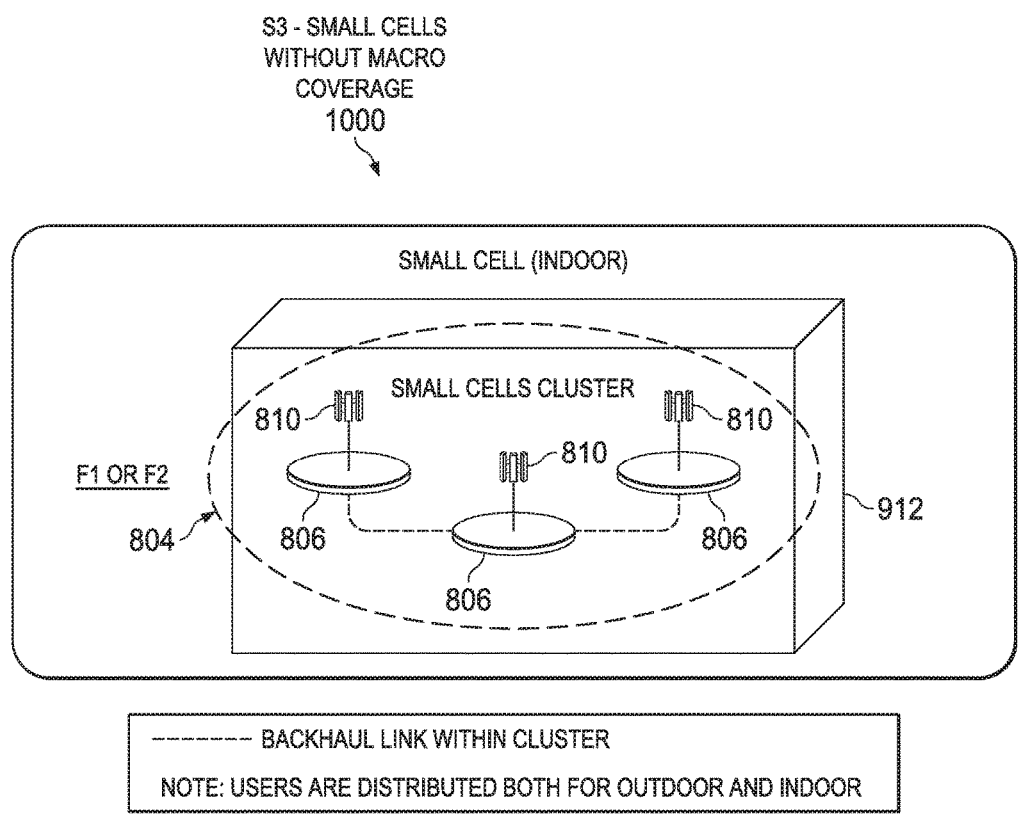
FIG. 10 illustrates an embodiment of small cells without macro coverage.

FIGS. 8, 9A, 9B and 10 illustrate various small cell deployment scenarios. FIG. 8 illustrates an embodiment of a system 800 of co-channel macro and small cells. FIG. 9A illustrates an embodiment of a system 900 of separate channel macro and outdoor small cells. FIG. 9B illustrates an embodiment of a system 950 of separate channel macro and indoor small cells. FIG. 10 illustrates an embodiment of a system 1000 of small cells without macro coverage.

System 800 includes a macrocell 802 served by a network access point (AP) 808 and a small cell cluster 804 that includes several small cells 806 each served by a small cell AP 810. In system 800 mobile devices are served by co-channel macro cells 802 and small cells 806. System 900 includes components similar to those described for system 800. However, in system 900, includes separate channel macro and outdoor small cells. In the embodiment shown in FIG. 9A, both the small cells 806 and the macro cell 802 are outside. System 950 shown in FIG. 9B is similar to system 900 except that the small cells 804 are inside a structure while the macro cell 802 is outside. System 1000 shown in Figure to includes a small cell cluster 804 that includes small cells 804 each served by a small cell AP 810 that are all located within a structure without macro cell coverage.

Usually UE discovers the surrounding small cells by firstly identifying the cell through detecting the downlink Primary Synchronization Signal (PSS)/Secondary Synchronization Signal (SSS). Secondly, UE performs signal power measurement based upon the downlink CRS of these identified cells from the first step. If the measured signal power is above a certain threshold, the cell discovery is considered successful. For mobility and other network operation optimization purposes, UE may be required to monitor several cells 806. To increase the chance the UE is able to discover weaker cells 806 under one or two dominant strong interfering cells 806, interference cancellation (IC) technique may be employed in which the dominant strong interfering cells are first discovered and then their PSS/SSS/CRS are reconstructed and subtracted from UE received signal. Weaker cell discovery is then performed upon the remaining signal. While in dense small cell scenarios, there could be several strong interferers of similar strength. Under this interference condition, there is little benefit of interference cancellation due to the lack of a small number of dominant interferers. In another small cell deployment scenario, efficient small cell operation may require the introduction of techniques for interference management where some small cells may be silent (e.g., turned off and dormant) at certain times. With the reduced interference, it may be possible to maintain or even improve the network throughput performance with reduced network resources, in cases such as where the traffic load is light or medium. If the traffic load increases, on the other hand, the network may activate (i.e., turn on) some inactive (or OFF) small cells to support the increased traffic load. For example, transmission of common signals can be avoided in certain subframes without negative impact to the UE measurements. On the other hand if such solutions consist of cells that stop transmitting for a long time, the discovery of these cells would become even more challenging.

Figure 11:
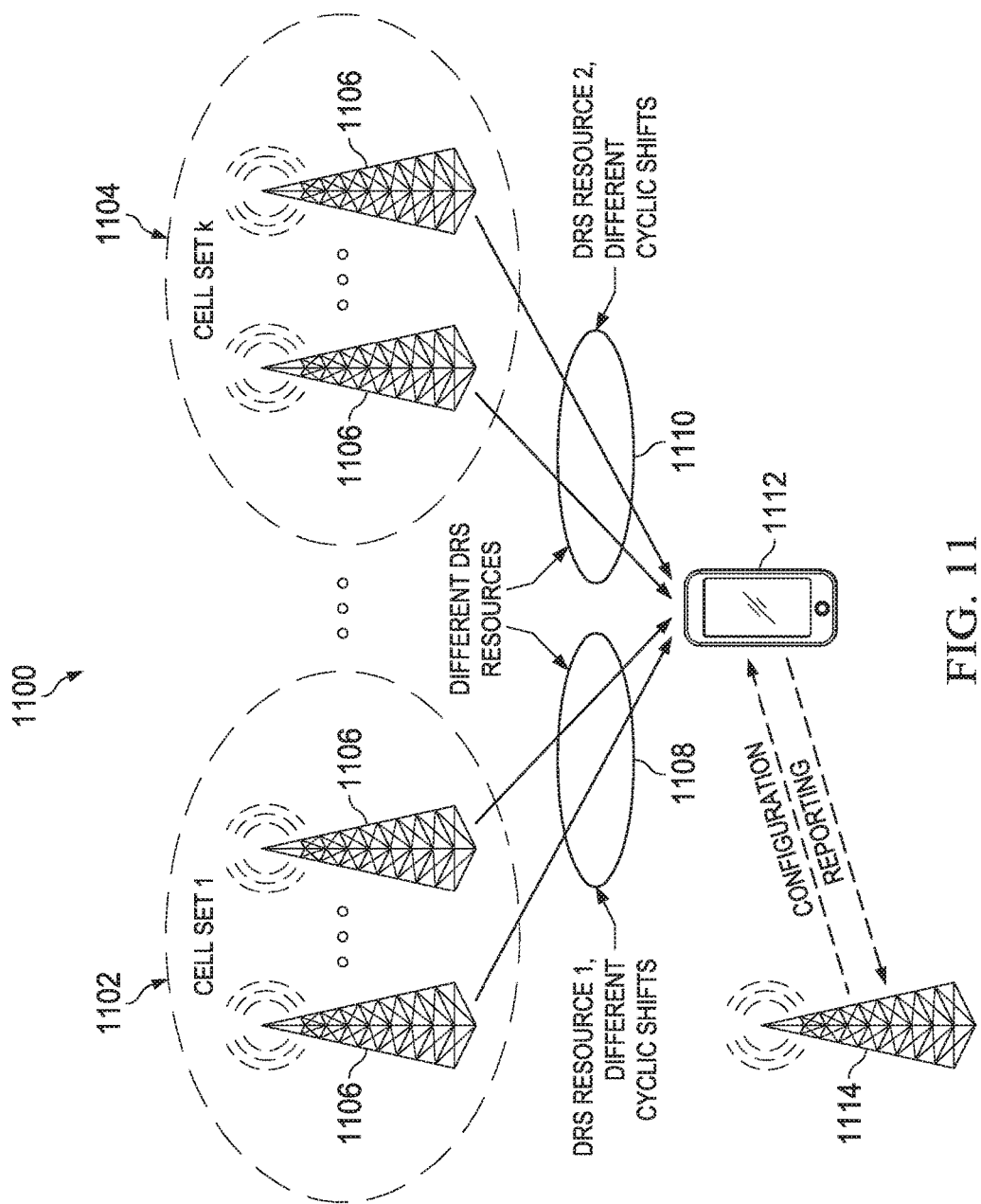
FIG. 11 illustrates an embodiment system utilizing a DRS.

An embodiment device and method provide a downlink discovery reference signal (DRS) design. FIG. 11 illustrates an embodiment of a system 1100 utilizing a DRS. System 1100 includes a plurality of cell sets 1102, 1104 and DRS resources 1108, 1110, each associated with a respective one of the cell sets 1102, 1104. Each cell set 1102, 1104 includes a plurality of APs 1106. DRS resource 1108 includes different cyclic shifts from DRS resource 1110. System 1100 also includes a UE 1112 that receives configuration information from a network controller 1114 and reports radio resource management measurements from one or more of the cell sets 1102, 1104 back to the network controller 1114.

A DRS resource 1108, 1110 may include time, frequency, sequence, and carrier. The cells 1102, 1104 signaling the DRS configuration to the UE 1112 may be a subset of the cells sharing the same DRS configurations or some other cells, e.g., the macro cell. The cells receiving UE DRS measurement reports may be a subset of the cells sharing the same DRS configurations or some other cells, e.g. the macro cell.

Figure 7:
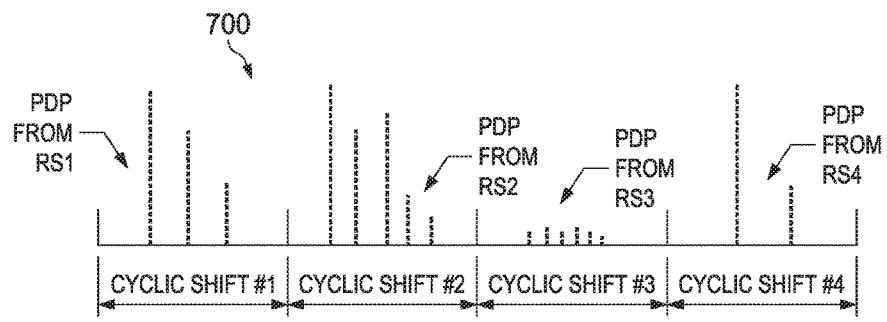
FIG. 7 illustrates an embodiment example of channel PDP from different transmitters.

In LTE systems, generally the cells close to each other do not use the same RS configurations. The RSs of these cells are separated in time, frequency, space, and/or sequence, in order to avoid strong inter-cell interference among the RSs. However, in uplink, different UEs close to each other may share some RS resources in time, frequency, space, and sequence. Separation of these RS is done by recognizing the fact that the channel impulse response (and hence PDP) is of finite duration. Thus RS of different transmitters can be transmitted in the same OFDM symbol and same sets of subcarriers with different cyclic shift values and separable channel PDP estimates are obtained at the receiver. Since a cyclic time shift is equivalent to a phase ramp in the frequency domain, each transmitter can apply the corresponding cyclic shift by phase ramp upon the subcarrier in the frequency domain. FIG. 7 illustrates an example of channel PDP estimates 700 in time domain corresponding to processing results of the received RS from different transmitters. In this example, there are four RS transmitted from four transmitters by applying different cyclic shifts upon the same pseudorandom sequence. The PDP estimates are not overlapped in the time domain in the figure because each channel PDP estimate is assigned with different cyclic offset in the time domain. Note that the time duration in this figure corresponds to a PDP estimation time range.

However, it has been viewed undesirable or very challenging if such RS separation used in uplink is to be extended to downlink RS transmissions. The reasons may include the following factors. First, the downlink transmissions in baseline LTE (e.g. LTE Rel-8) may not be synchronized. Therefore, the PDP estimates from different cells may be based on different time references and hence they cannot be identified and separated at the receiver (i.e. UE) with sufficient accuracy. On the contrary, the uplink transmissions are synchronized for a receiver (i.e. a cell). Second, a macro cell usually covers a wide area, and therefore the propagation delay differences from different macro cells seen by a UE may cause PDP estimates shift in time, which makes the PDP estimates difficult to be identified and separated with sufficient accuracy. Third, LTE RS in an OFDM symbol is distributed in time domain in a fashion such as one RS RE in every six REs. This makes the PDP estimation time range quite small and hence it is generally not suitable to use cyclic shifts to distinguish cells.

The deployment of small cells and small cell clusters may have improved synchronization. Generally small cells close to each other may be synchronized with sufficiently high accuracy, and small cells within a cluster may be synchronized. In addition, the propagation delay differences from different small cells in a neighborhood to a UE may be small due to the short range of the small cells. Moreover, in some cases it is desirable for the DRS to have high density in frequency domain. Therefore, it may be feasible to allow different small cells in a neighborhood to use the same DRS resources with only different cyclic shifts, and various benefits may follow from this design as discussed later.

To support small cell on/off operation, the UE needs to detect the small cell even if the cell is in OFF state (or dormant state). During the OFF state, the cell still transmits certain discovery reference signal (DRS). During the ON state, the cell can at least transmits the PSS/SSS/CRS. Also important, it is beneficial for a UE to perform radio resource management (RRM) measurements based on the DRS since significant system gain can be achieved if the RRM measurement can be performed before the cell is turned on. The candidate DRS is chosen from one or several of the legacy signals, e.g., PSS, SSS, CRS and channel state information-reference signal (CSI-RS), with possibly different transmission duty cycles.

Figure 12:
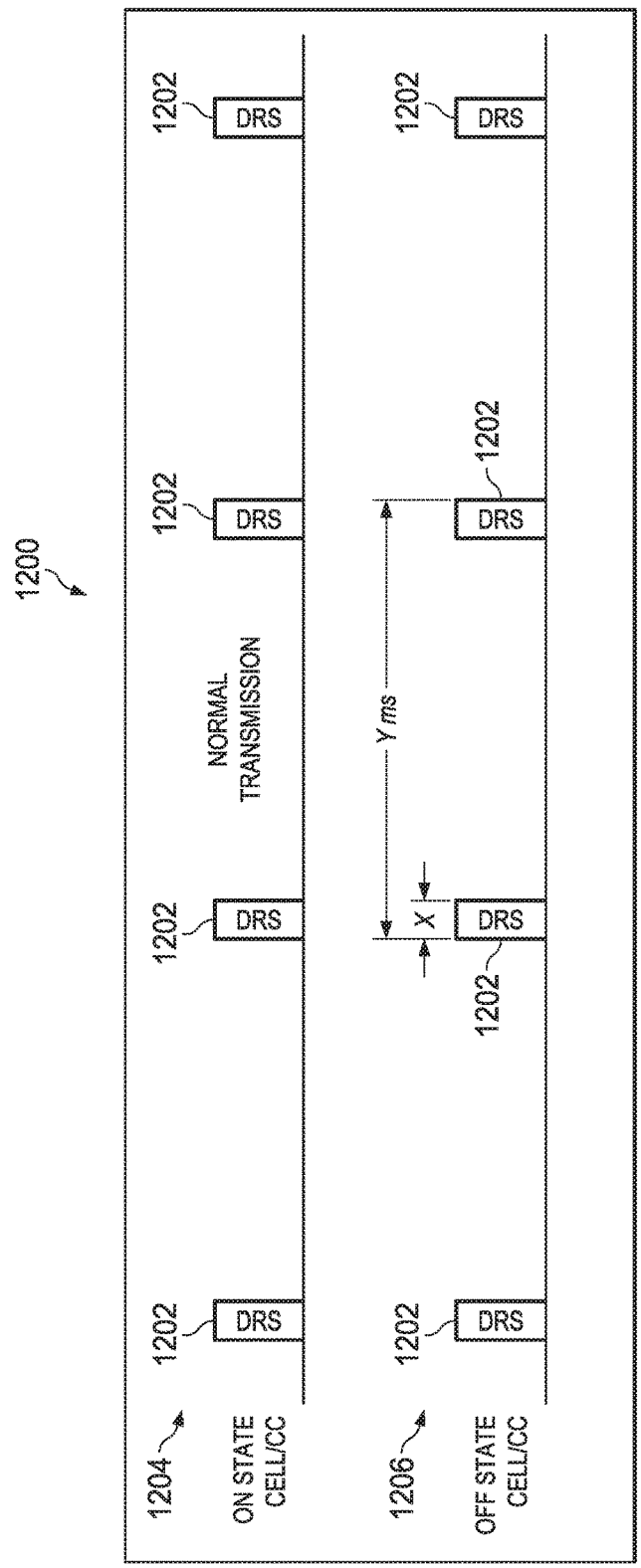
FIG. 12 illustrates an embodiment of a DRS transmitted in burst mode.

FIG. 12 illustrates an embodiment of a DRS 1200 transmitted in burst mode. In an embodiment, the discovery reference signal (DRS) is transmitted in burst mode as shown in FIG. 12. The duration of each burst 1202 is x ms and the period of the burst 1202 is y ms. In an embodiment, the duration of each burst is about 5 ms. The DRS is transmitted from the cell/component carrier in OFF state 1206. The cell/component carrier in ON state 1204 may or may not transmit the DRS burst 1202. To facilitate inter-frequency measurement, the inter-frequency measurement gap period should be multiple times of DRS burst period. The burst duration x and periodicity y is signaling to UE.

To optimally place UE FFT window in receiving DRS burst, it is beneficial if UE can receive some reference signal for coarse synchronization. PSS serves this purpose very well:
  PSS has only three possible sequences
  PSS has good auto and cross correlation
  PSS processing is already implemented in UE
So in the DRS design it is desirable to transmit PSS in the DRS burst for coarse synchronization.

Figure 13:
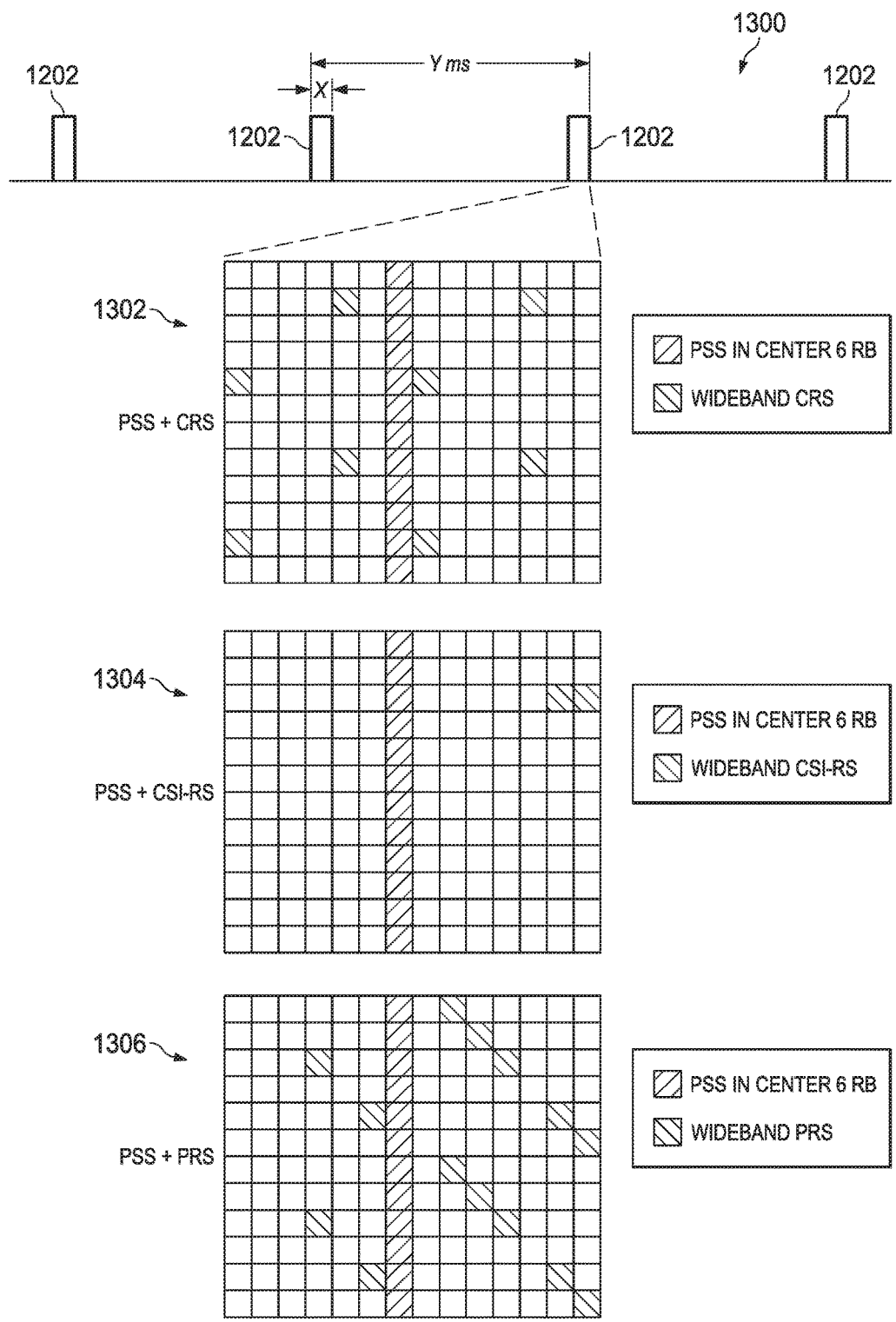
FIG. 13 illustrates embodiment examples of a DRS with SS and CID-RRM signals in a single subframe.

FIG. 13 illustrates embodiment examples of a DRS 1300 with SS and CID-RRM signals in a single subframe. In an embodiment, each DRS burst consists of two parts: the transmission of a synchronization signal (e.g., PSS, PSS plus SSS, or their enhancements) and the transmission of a CID_RRM (cell identification and radio resource measurement) signal. The UE may utilize the PSS to acquire coarse timing and position its FFT window for the reception of CID_RRM. The UE then performs cell identification and RRM measurement based on the received CID_RRM signal part. FIG. 13 shows three examples of DRS burst with x=1 ms. In one example 1302, the DRS burst 1202 includes PSS and CRS where the PSS is in the center six RBs with wideband DRS. In a second example 1304, the DRS burst 1202 includes PSS and CSI-RS with the PSS in the center six RBs with wideband CSI-RS. In a third example 1306, the DRS burst 1202 includes PSS and PRS with PSS in the center six RBs with wideband PRS. In this example, CRS, CSI-RS and PRS are transmitted as the CID_RRM signal part respectively.

Figure 14:
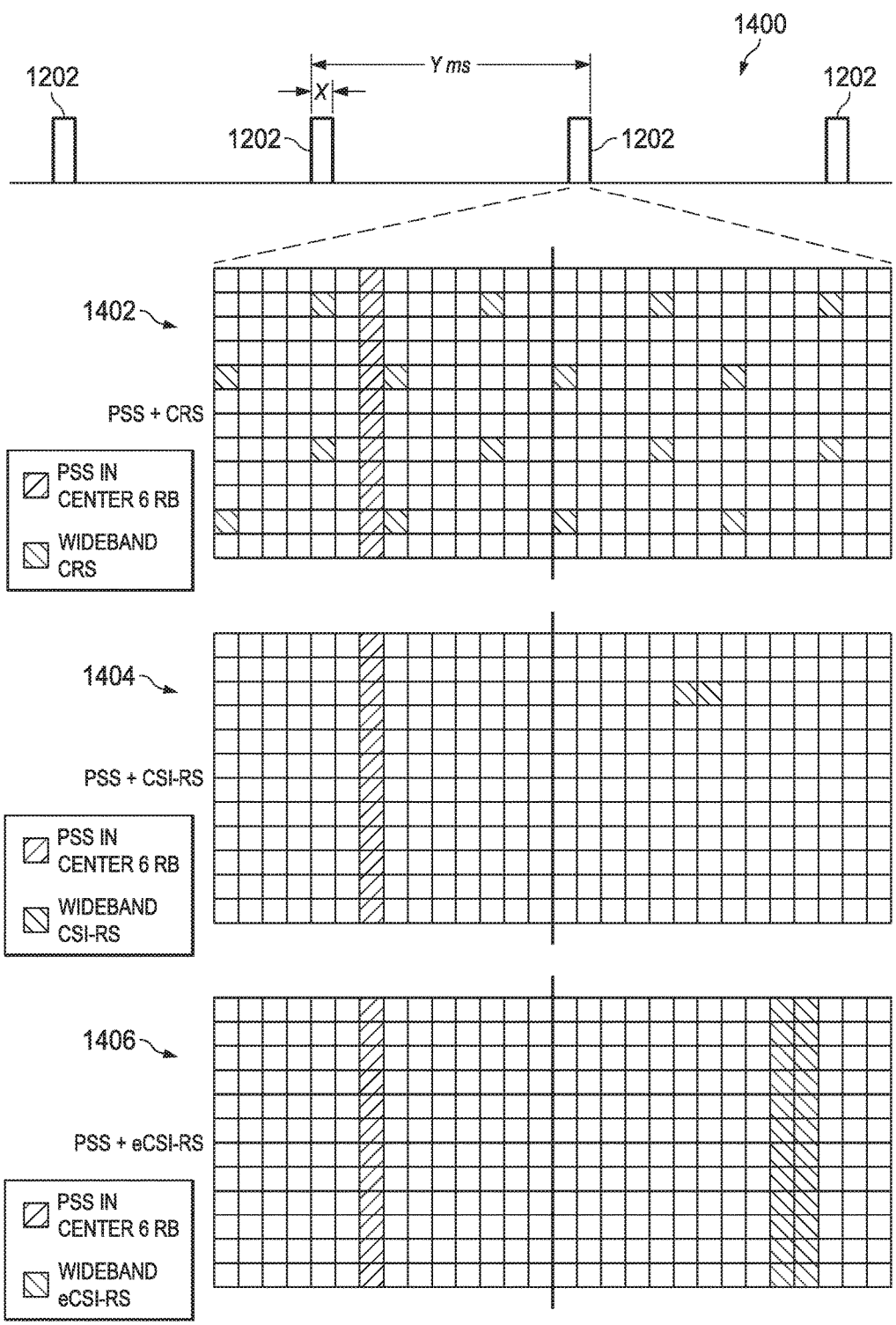
FIG. 14 illustrates embodiment examples of DRS with SS and CID-RRM signals in 2 subframes.

FIG. 14 illustrates embodiment examples of DRS with SS and CID-RRM signals in 2 subframes. FIG. 14 shows another three examples of DRS burst 1202 with x=2 ms. CRS, CSI-RS and eCSI-RS are transmitted as the CID_RRM part respectively in the example. Examples 1402, 1404, and 1406 are similar to examples 1302, 1304, and 1306.

There are different candidate CID_RRM in terms of functionalities, i.e., cell identification and RRM measurement. We can classify DRS into several design options accordingly. Table 1 lists the proposed DRS design options in which x ms/y ms mean the DRS burst is on for x ms with y ms periodicity.

Table 1. DRS Design Options

| | Resources | | | | requirements/functionalities | |
|---|---|---|---|---|---|---|
| Design Option | PSS | SSS | CRS | C SI-RS | Cell identification | RRM |
| DRS 1 | 5 ms | 5 ms | 1 ms | off | PSS + SSS (<=2) | CRS, NB/WB |
| DRS 2 | x ms/y ms | x ms/y ms | off | off | PSS + SSS (<=2) | SSS + IC, NB |
| DRS 3 | x ms/y ms | x ms/y ms | x ms/y ms | off | PSS + SSS or CRS (<=2) | CRS, WB |
| DRS 4 | x ms/y ms | x ms/y ms | off | x ms/y ms | PSS + SSS or CSI-RS (>=3) | CSI-RS, WB |
| DRS 5 | x ms/y ms | off | x ms/y ms | off | CRS (<=2) | CRS, WB |

-continued

| Design Option | Resources | | | | requirements/functionalities | |
| --- | --- | --- | --- | --- | --- | --- |
| | PSS | SSS | CRS | C SI-RS | Cell identification | RRM |
| DRS 6 | x ms/y ms | off | off | x ms/y ms | CSI-RS (>=3) | CSI-RS, WB |
| DRS 7 | x ms/y ms | off | off | x ms/y ms eCSI-RS | eCSI-RS (>=3) | eCSI-RS, WB |

In an embodiment, in the DRS 1 design option, the small cell in the OFF state basically transmits the legacy PSS/SSS/CRS but no other signals. The UE should derive its functionalities based on the received PSS/SSS for every 5 ms and CRS for each downlink subframe:

Cell identification—PSS/SSS
RRM measurement—CRS

Since the legacy PSS/SSS/CRS are transmitted, the UE is able to reuse the legacy implementation which has benefits of minimum specification and implementation changes. The obvious drawback is that a small cell not serving any UE may cause significant interference for the neighboring active small cells due to its PSS/SSS/CRS; leading to degraded system performance. This option is also not efficient from an energy consumption point of view since the small cell needs to wake up frequently or stay awake all the time. Another major issue is that the number of small cells which can be reliably detected by the UE is less than 3 even by applying the interference cancellation technique in the identification process. In order for efficient small cell operations, a UE should be able to detect at least three small cells considering the aspects of load balancing, deploying potential various available techniques to improve spectrum efficiency under different backhaul assumptions, etc. Another issue arises when the legacy UE tries to perform cell identification for initial access or mobility in the small cell layer since it is possible that a strong DRS could block legacy UE from detecting other active cells.

In an embodiment, to overcome the energy consumption and significant interference issues, in the DRS 2 design option, PSS/SSS are transmitted for x milliseconds (ms) every y ms and the CRS is turned off when the cell is in OFF state:

Cell identification—PSS/SSS
RRM measurement—SSS

The design parameters x and y specify a DRS duty cycle and should be chosen to avoid frequent transmission while ensuring satisfactory cell detection and RRM measurement performance. Since the cell detection is still based on the PSS/SSS, it also suffers the disadvantage of insufficient number of reliably detected small cells (≤2). The RRM measurement should be derived from the SSS signal since CRS is unavailable to the UE during the OFF state. In SSS interference cancellation, channel estimation is normally obtained based on the CRS with both frequency and time domain filtering. In DRS 2 design, there is no CRS transmission from cells in OFF state, then UE has to relies on PSS to derive the channel estimation which is inferior to CRS-based since time domain filtering is no longer available and only the composite channel among all cells with the same PSS can be estimated. The resulting channel estimation accuracy may compromise the gains of SSS interference cancellation. The cell identification for legacy UE is improved during the time period of DRS being off. But the actual cell identification time may be prolonged since the PSS/SSS transmitted in DRS burst could block or cause confusion for the legacy UE.

In an embodiment, DRS 3 is similar to DRS 2 except it transmits additional CRS in the DRS burst.

Cell identification—PSS/SSS or CRS
RRM measurement—CRS

UE could rely on the wideband CRS for RRM measurement since it is available in limited time slot. Again the number of reliably detected small cells is less still than 3 as the detection is based on PSS/SSS or CRS. Similar to DRS 2, periodic burst of PSS/SSS/CRS for cell in OFF state will disturb the cell identification process of legacy UEs in the small cell layer.

In an embodiment, DRS 4 is similar to DRS 2 except an additional CSI-RS is transmitted in the DRS burst.

Cell identification—PSS/SSS or CSI-RS
RRM measurement—CSI-RS

In DRS 4, the UE has the option to perform cell detection based on the configured CSI-RS. The network should coordinate and orthogonalize the transmission of the CSI-RS among the neighboring small cells by applying RE muting. The higher received SINR for CSI-RS helps the UE to improve its cell detection probability. The number of reliably detected small cells is expected to be greater than 2 which facilitate the efficient operation of small cells. The UE should also depend on CSI-RS for the RRM measurement. Compared with the scenario in CoMP, RRM measurement for this option has the advantage of the availability of CSI-RS with larger bandwidth and much improved SINR resulting from high degree of CSI-RS orthogonalization, and the disadvantage of much longer periodicity. Since PSS/SSS are transmitted in the DRS burst, the legacy UE cell identification issue still exists as with the previous options.

In an embodiment, DRS 5 is similar to DRS 3 except it does not transmit SSS in the DRS burst.

Cell identification—CRS
RRM measurement—CRS

SSS is not transmitted to avoid disturbing the legacy cell identification process since no valid Cell ID can be detected by the legacy UE. The CRS-based cell detection scheme still has the limitation of only less than 3 small cells being reliably detected. The RRM measurement can be performed on the wideband CRS signal. The CRS transmission in the DRS burst may generate significant interference.

In an embodiment, DRS 6 is similar to DRS 4 except it does not transmit SSS in the DRS burst.

Cell identification—CSI-RS
RRM measurement—CSI-RS

Including the benefit of not transmitting SSS during the DRS burst, option DRS 6 has an additional advantage of an increased number of reliably detectable small cells (≥3) for CSI-RS based detection. A larger number of detectable cells is highly desirable for introducing design requirements that are scalable; that is, the requirements should still hold sufficiently for denser networks of small cells which may be deployed in the near future. As with DRS 4, the RRM measurement is based on the wideband CSI-RS signal.

In an embodiment, DRS 7 introduces a new reference signal design for discovery.

Cell identification—eCSI-RS
RRM measurement—eCSI-RS

Figure 15:
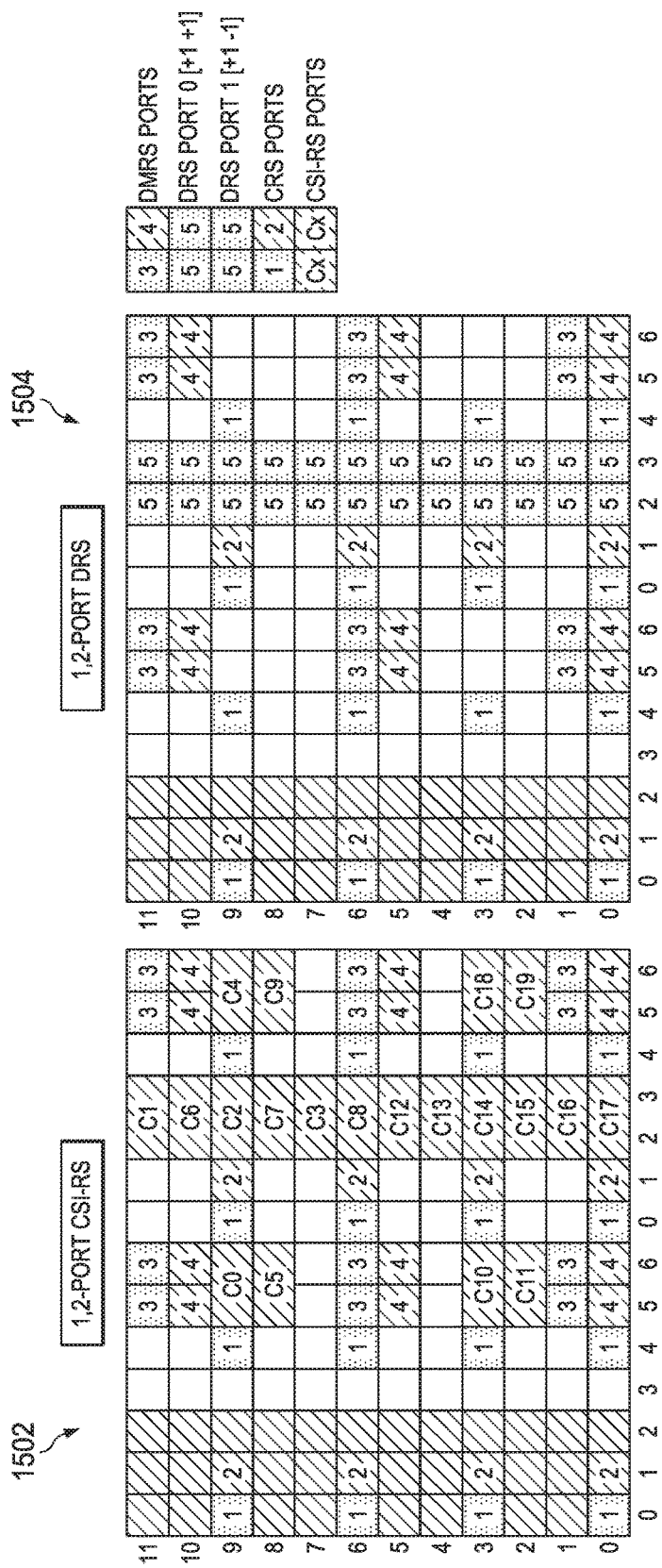
FIG. 15 illustrates an embodiment of a DRS with CID-RRM signal using eCSI-RS.

FIG. 15 illustrates an embodiment example of the time and frequency resource allocation. DRS 7 is different from DRS 6 (which utilizes CSI-RS as discovery reference signal) in that it occupies the whole wideband and the cyclic shift is used to differentiate the received eCSI-RS among the coordinated small cells. As shown in FIG. 15, two eCSI-RS ports 1502, 1504 (one port from one cell) can be multiplexed onto OFDM symbols 9 and 10 which overlap with CSI-RS so it is easy to do rate matching for legacy UE and RE muting between overlapped eCSI-RS burst from two different small cell clusters through ZP CSI-RS configuration.

Compared to the CSI-RS, eCIS-RS has much higher density along the frequency domain, which results in better detection performance, RRM measurement accuracy and finer time synchronization precision. Also the UE implementation complexity is reduced since processing several eCSI-RS can share one larger IFFT operation followed by channel estimation and RRM measurement within each cyclic shift. The number of cyclic shifts is a design parameter and can be configured by the network considering the deployment scenarios, e.g. 6 cyclic shifts to accommodate the maximum path delay and network synchronization errors to achieve satisfactory orthogonalization. Multiple eCSI-RS sequences can be multiplexed by applying different scrambling sequences if needed to increase the eCSI-RS capacity. The eCSI-RS scrambling sequence could be a new sequence design. While the other option to maximally utilize the CSI-RS sequence already stored in the UE is that every small cell in the cluster transmits CSI-RS with the same virtual cell ID onto OFDM symbol 9 and 10 (i.e. a total of 12 CSI-RS configurations occupy OFDM symbol 9 and 10) with proper phase ramping applied on the frequency domain sequence.

In an embodiment, the PSS sequence transmitted in the DRS burst may be the same PSS sequence associated with the PCID of the cell/cc. In other case, it may be a different PSS sequence other than the PSS sequence associated with the PCID of the cell/cc, e.g. all the coordinating cell/cc in the cluster transmits the same PSS sequence and network informs UE the PSS sequence ID through signaling.

In an embodiment, each DRS burst contains at least one PSS transmission. Since PSS has periodicity of 5 ms, depending on the duration of x, multiple PSS transmission may occur in one DRS burst. For DRS burst duration longer than 1 ms, PSS and CID_RRM signal parts may not reside in the same subframe. Network could configure their relative position and inform UE through signaling.

In an embodiment, the antenna ports of SS (e.g., PSS) and CID_RRM are related by a quasi co-location assumption for time and frequency synchronization (average delay and Doppler shift). Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay. The power difference between PSS and CID_RRM is predefined or signaled to UE. UE may utilize PSS as reference to adjust its AGC for the reception of CID_RRM.

In an embodiment, in the case that CRS is transmitted as the CID_RRM signal, network configure the PCID used for generating the CRS signal and the number of antenna ports for transmitting CRS. UE is informed of the configurations through signaling.

In an embodiment, in the case that CSI-RS is transmitted as the CID_RRM signal, network coordinates the configuration of NZP CSI-RS resource of each target cell achieving the orthogonal CSI-RS resource allocation within the cluster. The sequence transmitted on each CSI-RS resource may be different from each other and the mapping between the sequence ID and NZP CSI-RS resource is signaled to UE by the network. In other case, the same sequence may be shared and transmitted on all of the configured NZP CSI-RS resource. The sequence is derived from a common virtual cell ID which is signaled to UE by network.

In an embodiment, after receiving the NZP CSI-RS, UE may perform independent cell identification and RRM measurement (RSRP and RSRQ) on each NZP CSI-RS resource configured for the target cell/cc.

In an embodiment, network may configure ZP CSI-RS for each target cell/cc to provide RE muting for protecting the NZP CSI-RS transmission of other cell/cc. For UE capable of supporting multiple ZP CSI-RS, proper ZP CSI-RS is configured for UE to perform rate matching in case PDSCH is scheduled along with NZP CSI-RS. For UE incapable of supporting multiple ZP CSI-RS, network scheduler should avoid scheduling PDSCH transmission along with the transmission of NZP CSI-RS part.

In an embodiment, the case that eCSI-RS is transmitted as the CID_RRM signal, eCSI-RS is transmitted on all the RE across the whole bandwidth of OFDM symbol 9 and symbol 10 which overlap with some of the CSI-RS resources. To avoid colliding with PSS, SSS, PBCH and SIBs, eCSI-RS should not be configured in subframes where such collision may happen.

In an embodiment, the same sequence may be shared and transmitted by all the target cell/cc within the coordinating cells/ccs. To distinguish the signal from each target cell/cc, each target cell/cc applies different cyclic shift when transmitting the sequence. The total number of cyclic shift is configured and signaled by the network such that sufficient orthogonal separation can be achieved accommodating maximum propagation path delay and network synchronization errors, e.g. 6 total possible cyclic shifts. The common sequence may reuse the Chu or Gold sequences already defined for other signals of LTE, e.g.

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 12N_{RB}^{max,DL} - 1$$

The sequence initialize, $C_{init}$ is a function of slot number and network configured virtual cell ID.

In an embodiment, two eCSI-RS ports are formed by share the same set of RE through OCC, e.g. [++] is applied on RE of OFDM symbols 9 and 10 for one eCSI-RS port and [+−] for the other eCSI-port.

The eCSI-RS sequence, eCSI-RS port and specific cyclic shift configured for each target cell/cc by network uniquely form its CID_RRM signal part. UE is informed through signaling of the sequence ID, port number and cyclic shift for each target cell/cc. Upon receiving the CID_RRM signal, UE should perform independent cell identification and RRM measurement (RSRP and/or RSRQ) within each set of eCSI-RS configuration for each target cell/cc.

In an embodiment, more than one eCSI-RS sequence may be configured to be transmitted on the same RE to increase eCSI-RS capacity. In this case, UE may apply corresponding sequence for descrambling before performing IFFT and the following cell identification and RRM measurement.

In an embodiment, network may configure more than one eCSI-RS transmissions multiplexed in time to increase eCSI-RS capacity. As an example, network configures one eCSI-RS transmission for cell #1 to #12 in DRS burst starting at mod(SFN, 80)=0 and the other eCSI-RS transmission for cell #13 to #24 in DRS burst starting at mod (SFN+40, 80)=0. UE should receive and process the eCSI-RS every 40 ms.

In an embodiment, for UE capable of supporting multiple ZP CSI-RS, proper ZP CSI-RS is configured for UE to perform rate matching in case PDSCH is scheduled along with eCSI-RS. For UE incapable of supporting multiple ZP CSI-RS, network scheduler should avoid scheduling PDSCH transmission along with the transmission of eCSI-RS part.

Figure 17:
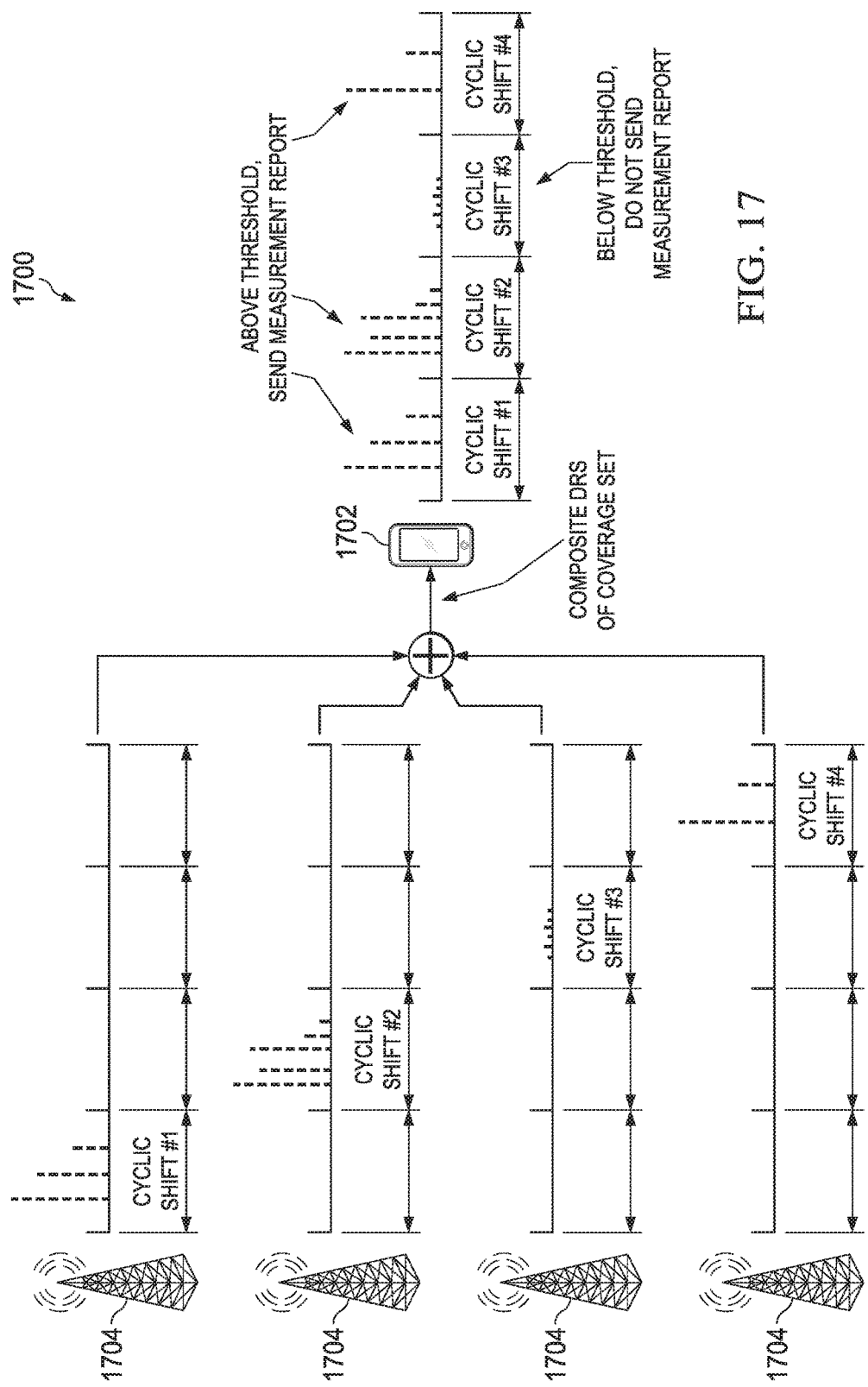
FIG. 17 illustrates an embodiment example of a coverage set consisting four small cells.

In an embodiment, beside network signaling UE to report the RRM measurement results based on the DRS, network may instruct UE to perform certain RSRQ hypothesis. This is especially useful when orthogonal CSI-RS or eCSI-RS is transmitted in the DRS burst cases. As an example, FIG. 17 shows the eCSI-RS transmission at the cell side and the reception/processing at the UE side.

Suppose $RSRP_i$ is estimated for each target cell within the cyclic shift region and $RSSI_i$ is the total received power within each cyclic shift region, then one specific RSRQ hypothesizes on cell 4 being on/off and cell 1 being the serving cell are, $$RSRQ(\text{cell}\#4 \text{ is on}) = \frac{RSRP_1}{\sum_i RSSI_i}$$

$$RSRQ(\text{cell}\#4 \text{ is off}) = \frac{RSRP_1}{\sum_{i \neq 4} RSSI_i}$$

A CSI-RS resource is defined by the number of CSI-RS ports, resourceConfig, subframeConfig, scrambling ID (Pc is not considered here since the UE would only need to take RSRP measurements on the DRS). Configuration parameters are needed for the CSI-RS (option DRS 6) and eCSI-RS (option DRS 7).

If existing CSI-RS are reused (option DRS 6), there is no need to define multiple antenna ports if that CSI-RS resource is not also used for CSI measurements. However, the number of resource elements occupied by the CSI-RS resource should guarantee to have good RRM performance. The number of REs of a CSI-RS resource of DRS may be signaled by network assistance or pre-defined. The number of REs and the use of muting will impact the performance of DRS-based cell discovery and RRM measurements. Exploiting OCC to separate the DRS from two cells is feasible, so OCC ID may also be part of the CSI-RS resource configuration (i.e. similar as signaling port 15 or 16).

For an eCSI-RS resource (option DRS 7), subframeConfig and scrambling ID may be reused. Cyclic shift information needs to be added. ResourceConfig can be simplified to indicate the OFDM symbols in which the resource is located, unless it is pre-defined in a subframe. The number of CSI-RS ports can just be replaced by the OCC information. The number of REs occupied by the eCSI-RS resource is fixed and is expected to have good measurement performance since the proposed design occupies all REs in two OFDM symbols.

Network assistance for discovery is provided to the UE by signaling the configuration of the DRS of cells within a set of coordinated cells. The assistance signaling consists of a candidate cell list. For each cell, the signaling provides information about PSS ID, CSI-RS or eCSI-RS configuration information (number of resource elements (FFS for CSI-RS), resourceConfig, subframeConfig, scrambling ID, cyclic shift (for eCSI-RS), OCC ID), and quasi co-location information between PSS and CSI-RS/eCSI-RS with respect to average delay and Doppler shift.

In an embodiment, the DRS should rely on CSI-RS/eCSI-RS at least for cell identification and RRM measurements, and additionally relies on PSS for coarse synchronization. PSS is used to obtain coarse synchronization to the downlink signals transmitted within a cluster of coordinated small cell operating with on/off, thus PSS enables coarse synchronization to the CSI-RS/eCSI-RS part of the DRS, as defined for the UE by a quasi co-location assumption between the PSS antenna port and the CSI-RS/eCSI-RS antenna port(s).

The PSS antenna port and the CSI-RS/eCSI-RS antenna port(s) are related by a quasi co-location assumption for time and frequency synchronization (average delay and Doppler shift).

It is beneficial for improving the discovery performance and for reducing the UE detection complexity and power consumption. Given that the serving cell of a connected UE can obtain the coordination parameters of the small cells in the cluster operating with on/off, it is possible for the network to signal the entire configuration of DRS in the small cell cluster to the UE. Then the UE only needs to perform DRS detection for a list of candidate cells, including a known set of IDs and CSI-RS resources (including subframe information). Hence blind detection could be entirely avoided at the UE side.

In an embodiment, a mobile device receives from a first network controller, a first configuration of time intervals, and a first configuration of parameters of a first signal and of parameters of a second signal. The mobile device receives, within the configured time intervals, the first signal for synchronization using the first configuration of parameters for the first signal and the second signal for measurement using the first configuration of parameters for the second signal. The mobile device then transmits to a second network controller, reports of measurement based on the second signal. The measurement based on the second signal comprising a function of the received power of the second signal. The configuration of the time intervals comprising a period of intervals, a length of an interval, an offset value related to the time of the first network controller, or a combination thereof. The second network controller may be the first network controller. The mobile device may receive the first and the second signals transmitted from a third network controller. The configuration of the parameters of the first signal and of the parameters of the second signal may include quasi-co-location between the first and second signals and the antenna ports of the third network controller. The first signal may be for the mobile device to obtain synchronization in time, frequency, or both. The mobile device may not be configured to receive the first signal during the configured time intervals when the mobile device can already derive its timing and frequency, for example, from the first or second network controller.

In an embodiment, the mobile device may receive, from the first network controller, a second configuration of parameters of the first signal and of parameters of the second signal, and receives, within the configured time intervals, the first signal for synchronization using the second configuration of parameters for the first signal, and the second signal for measurement using the second configuration of parameters for the second signal, and then transmits, to the second network controller, reports of measurement based on the second signal.

In an embodiment, the antenna ports of the first signal and the second signal are associated as quasi-co-location while the mobile device assumes no quasi-co-location between the antenna ports of the first network controller and antenna ports of the first signal and the second signal without receiving configuration to indicate the quasi-co-location between them.

In an embodiment, the first signal uses the design of PSS sequence generation and mapping to resource elements for the subframes within the configured time intervals. As an alternative, the first signal uses the design of PSS and SSS sequence generation and mapping to resource elements for the subframes within the configured time intervals. The ID for generating sequence for the first signal is configured by the first network controller separately from the cell ID of the first network controller.

In an embodiment, the second signal uses the design of CSI-RS (or CRS, PRS) sequence generation, antenna port multiplexing and configuration, mapping to resource elements, and subframe configuration within the configured time intervals. The second signal may map to resource elements of multiple CSI-RS configurations. As an alternative, the second signal maps to all resource elements of OFDM symbol 9 and 10. As another alternative, the second signal uses the design of DMRS (or PSS, SSS) sequence generation.

In an embodiment, a network controller transmits, to a mobile device, a first configuration of time intervals, and a first configuration of parameters of a first signal and of parameters of a second signal. A second network controller transmits, within the configured time intervals, the first signal for synchronization using the first configuration of parameters for the first signal and the second signal for measurement using the first configuration of parameters for the second signal. A third network controller receives, from the mobile device, reports of measurement based on the second signal. The measurement based on the second signal comprising a function of the received power of the second signal. The configuration of the time intervals comprising a period of intervals, a length of an interval, an offset value related to the time of the first network controller, or a combination thereof. The third network controller may be the first network controller. The configuration of the parameters of the first signal and of the parameters of the second signal may include quasi-co-location between the first and second signals and the antenna ports of the second network controller. The first signal may be for the mobile device to obtain synchronization in time, frequency, or both. The first signal may not be transmitted during the configured time intervals when the mobile device can already derive its timing and frequency, for example, from the first or second network controller where the network controllers are synchronized in time and frequency to an satisfying level of accuracy.

In an embodiment, the signaling may be in the forms of macro cell broadcasting, macro sending UE specific radio resource control (RRC) signaling, small cell broadcasting, small cells sending UE specific radio resource control (RRC) signaling or any combination of the above.

In an embodiment, a first network controller signals to a UE a resource for DRS transmissions from a set of network controllers (e.g. macro cell or small cells), the total number of possible cyclic shift or a set of cyclic shifts each of which may be used for the DRS transmission of one network controller in the set of network controllers, and a reporting configuration. The DRS resource includes time, frequency and carrier on which the DRS is transmitted, and a sequence parameters to generate the DRS signal. The reporting configuration may include the triggering conditions for the UE to report the measurements on the DRS transmissions, and/or reporting resources and formats. A second network controller receives a report from the UE based on measurement on the DRS transmissions from the set of network controllers. In a further embodiment, a third network controller in the set of network controllers transmits a DRS on the resource with its associated cyclic shift.

In an embodiment, a UE receives the configuration of DRS transmission of a set of network controllers and a reporting configuration. The UE receives the DRS signal and performs measurement. The UE then sends a report based on measurement on the DRS transmissions to the network. The report may contain information about measurements associated with one or more cyclic shifts, namely, the measurements are associated with one or more small cells applying the same sequence on the same time/frequency resources but with different cyclic shifts. Therefore, the UE performs demodulation and descrambling based on one pseudorandom sequence associated with different small cells, and then separate each cell's signal in time domain, thus obtaining each cell's signal strength measurements.

In an embodiment, a DRS is designed for inactive and non-co-channel small cells discovery. The DRS design enables a UE to detect and measure many dormant small cells in a short DRS transmission burst. The DRS design enables a UE to detect and measure many possible small cells on different carriers in a short DRS transmission burst.

Figure 16:
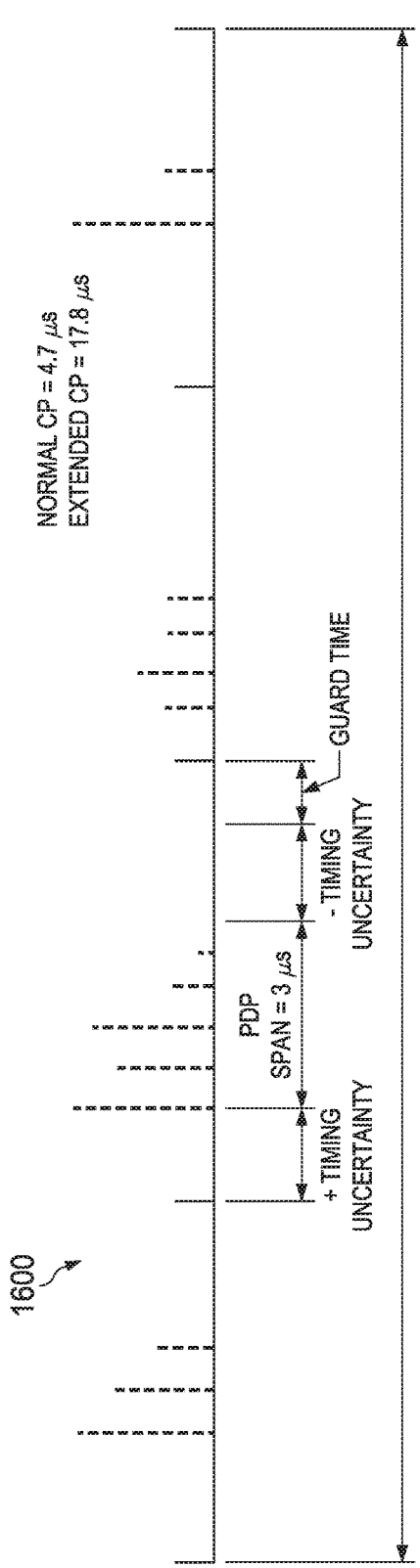
FIG. 16 illustrates an embodiment example of a design consideration of cyclic shift range.

In an embodiment, the design on the number of cyclic shift takes into consideration the transmission time difference from different network controllers and the PDP span. The transmission time difference depends on the synchronization accuracy within the network and can be bounded by positive timing uncertainty and negative timing uncertainty. The PDP span can be bound to be less than certain microsecond (us), e.g. 3 us in the small cell deployment scenario. Propagation delay differences may also be considered but this may not be important in small cell discovery. FIG. 16 illustrates an embodiment example of a design consideration 1600 of cyclic shift range and the corresponding number of total possible cyclic shift without PDP overlapping between two adjacent cyclic shift offsets. The following table shows several possible numbers of cyclic shifts and their cyclic offset ranges to hold the PDPs.

| | | | Number of cyclic shift | | | |
|---|---|---|---|---|---|---|
| | | | 1 | 2 | 4 | 6 |
| Time span/ cyclic shift | DRS tonespacing | 15 KHz | 66.7 us | 33.4 us | 16.7 us | 11.1 us |
| | | 30 KHz | 33.3 us | 16.7 us | 8.3 us | 5.6 us |

In an embodiment implementing the DRS signal, small cells are grouped into sets and DRS within the set share the same base sequence. The set of these small cells may be called as a small cell coverage set, a small cell proximity set, etc.; in the text below it is referred to as a coverage set. The coverage set is associated with a coverage set ID. The coverage set ID could be part of the signaling to UE or be associated with the coverage set in some predefined way, e.g. mapping rules from PSS/SSS to coverage set ID. The coverage set ID may be used by the UE to generate orthogonal or pseudorandom sequences. The sequence is used by all the small cells within the coverage set as the base sequence for DRS transmission. Each small cell within the coverage set applies the phase ramp corresponding to its cyclic shift upon the base sequence and maps it to subcarriers. The combined time domain signals from all of the small cells within the coverage set form the composite DRS signal. FIG. 17 illustrates an embodiment example of a coverage set 1700 consisting four small cells, each served by an AP 1704. The UE 1702 receives the composite DRS signal, obtains the PDP estimates and applies simple threshold for reporting.

In an embodiment generating the basic sequence for DRS transmission, the ZC sequences or pseudorandom sequences used for RS from current LTE specification may be reused for the base sequences of DRS.

An embodiment provides DRS transmission in a subframe with new frame structure which can be called special discovery subframe (SDS). In the SDS, several OFDM symbols are exclusively reserved for the transmission of DRS. For the data and control channels transmitted in OFDM symbols other than these for DRS, the signals colliding with DRS are relocated or rearranged. In the special case of DRS transmission only occupies the last several OFDM symbols in the subframe, the remaining OFDM symbols which carry the control and data channels could reuse the frame structure of special subframes of TDD as described in 3GPP Ts 36.211. In TDD special subframe, there are downlink pilot timing slot (DwPTS), guard time, and uplink pilot timing slot (UpPTS). The DwPTS may be kept in SDS so that normal downlink transmissions by cells (or by active cells) may be still performed, but the guard time and UpPTS may be replaced by a proposed downlink discovery pilot timing slot (DvPTS). FIG. 18 illustrates an embodiment example of a frame structure 1800 for SDS with 5 ms periodicity and the following table shows the detailed OFDM division between downlink pilot timing slot (DwPTS) and downlink discovery pilot timing slot (DvPTS).

configured for DRS transmission. The configuration is part of the signaling to UE or predefined.

An embodiment provides DRS transmission in a subframe with cyclic prefix length different from other subframes without DRS transmission. Since there is a wide range of synchronization accuracy level between the small cells operated by different wireless service providers, it could be beneficial for the subframe containing the DRS transmission to employ a different cyclic prefix length, e.g. extended cyclic prefix length is used in subframe with DRS transmission. The longer cyclic prefix length also provides additional benefit of easing the requirement on UE timing tracking accuracy and complexity.

An embodiment provides the triggering condition of sending the DRS. DRS can be configured to transmit aperiodically or periodically. In periodic DRS transmission, a periodicity is configured. In the case of aperiodic DRS transmission, DRS may be transmitted only once or multiple times at the configured transmission occasion. The configurations are part of the signaling to the UE or may be partially or completely in a separate signaling.

An embodiment provides the triggering condition of aperiodic DRS transmission. Single short DRS transmission may be the results of monitoring the UE uplink signal transmission or network reconfiguration operations, e.g. turn on/off the small cells.

An embodiment provides UE processing on the received DRS. UE receives the configured DRS transmission and performs the radio resource measurements, e.g. measure the received DRS power within the cyclic shift range independently. In case there are more than one OFDM symbols carrying the DRS, averaging of DRS corresponding to each cyclic shift on these OFDM symbols could be performed to further suppress the interference plus noise. Different measurement results are obtained for each possible cyclic shift.

An embodiment provides UE generating the measurement reports on the received DRS. Each measurement result obtained within the cyclic shift range is checked independently against the configured criteria, e.g. the received power should be above certain threshold. Among these DRS measurement results which pass the criteria, UE may report

|  | Normal cyclic prefix in SDS | | Extendee cyclic prefix in SDS | |
| --- | --- | --- | --- | --- |
| Special Discovery configuration | DwPTS (Ts) | DwPTS (Ts) | DwPTS (Ts) | DwPTS (Ts) |
| 0 | 19760 | 10960 | 20480 | 10240 |
| 1 | 21952 | 8768 | 23040 | 7680 |
| 2 | 24144 | 6576 | 25600 | 5120 |
| 3 | 26336 | 4384 | 28160 | 2560 |
| 4 | 28528 | 2192 | | |

All of the last several OFDM symbols or a subset of these could be configured to carry the DRS transmission. Several SDS can be configured to form one DRS transmission occasion. These configurations are part of the signaling to UE or predefined.

An embodiment provides DRS transmission in configured MBSFN subframe. Excluding the first two OFDM symbols reserved for control channels, all of the remaining OFDM symbols or a subset of these could be configured to carry the DRS transmission and the configuration is part of the signaling to UE or predefined.

An embodiment provides DRS transmission in the configured OFDM symbol. All of the subcarriers in the OFDM symbol or a subset of it can be used for the transmission of DRS, e.g. every other subcarriers in the OFDM symbols are only the highest one along with its cyclic shift information. UE may report all the measurement results which pass the criteria along with their corresponding cyclic shift information. The measurement type and criteria are part of the signaling to UE or predefined. In general, the UE may report the top N measurements associated with one sequence (i.e. one coverage set) or multiple sequences (coverage sets), or report all measurements above a threshold associated with one sequence (i.e. one coverage set) or above one or more thresholds associated with multiple sequences (coverage sets), or a combination of these. Various embodiments may be provided for various purposes.

DRS which may be transmitted with very small spacing between subcarriers and OFDM symbols helps to meet the requirement of detecting many inactive small cells in a short DRS transmission burst. That is, the DRS may be transmitted on contiguous subcarriers. It may be transmitted in a narrow band, similar to CRS used for UE to perform RRM measurements, but in some cases it may be desired to transmit at wideband. In either case the bandwidth of the DRS may be configured in the DRS configuration signaling. In some cases, to reduce the overhead of DRS, wider and even non-uniform spacings between DRS REs may be used. The non-uniform spacings between DRS REs may be useful for expanding the PDP estimation time range to the full DRS symbol duration, but exactly how the non-uniform spacings may be signaled may affect the obtained PDP estimation accuracy, and certain patterns may need to be adopted for the UE to find all the DRS REs. Orthogonality by cyclic shift helps to mitigate the strong interference seen in the small cell environment. A composite DRS with each eNB transmitting at a different cyclic shift helps to reduce UE operation complexity. PSS/SSS may or may not be transmitted by other small cells within the coverage set, once UE obtains the DRS configuration, UE may not need to detect these PSS/SSS for the other small cells sharing the same base DRS sequence within the coverage set. Single descrambling, inverse Fast Fourier Transform (IFFT) and channel estimation filtering operation for small cells share the same base DRS sequence help to reduce the UE operation complexity.

Figure 19A:
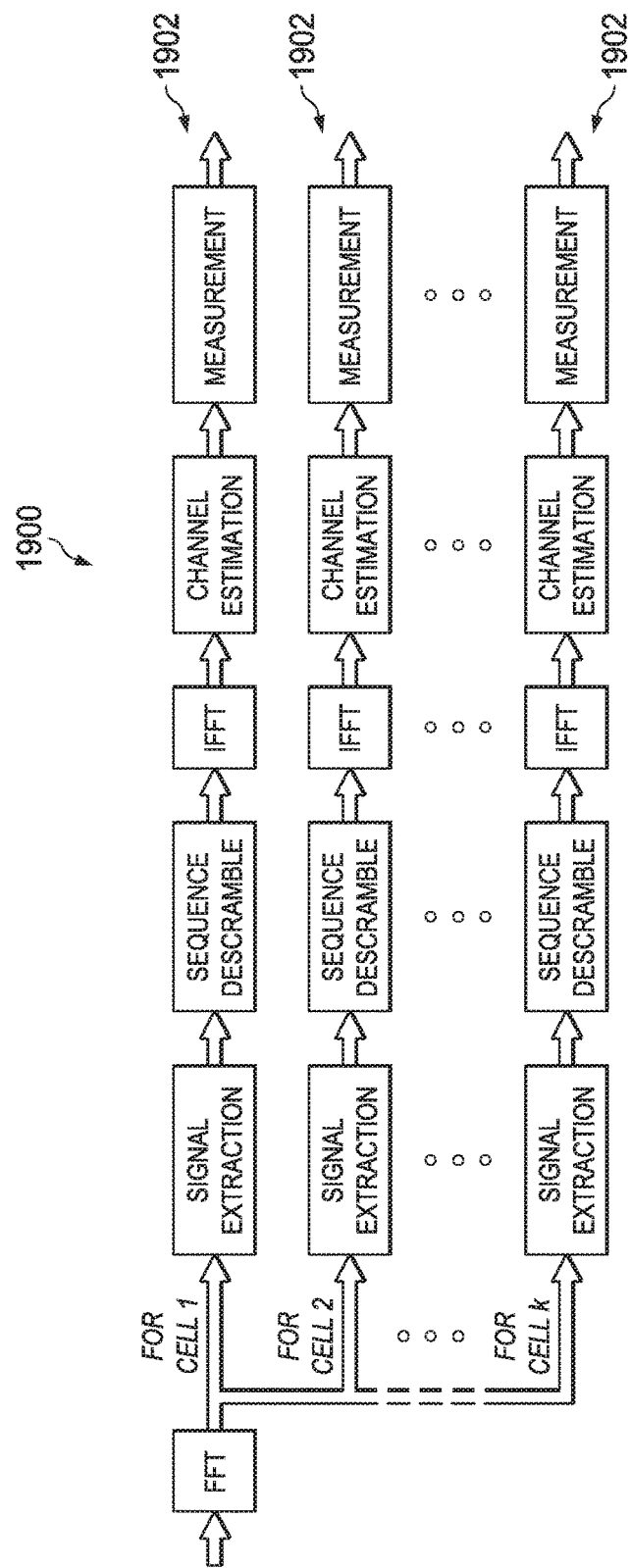
FIG. 19A illustrates an embodiment of a CRS-based measurement.

For comparison, FIG. 19A illustrates an embodiment system 1900 for a CRS-based measurement. If a UE is required to perform detection and measurement for 12 small cells and up to 5 active carriers, the UE needs to support 600 detection and measurement processes 1902.

Figure 19B:
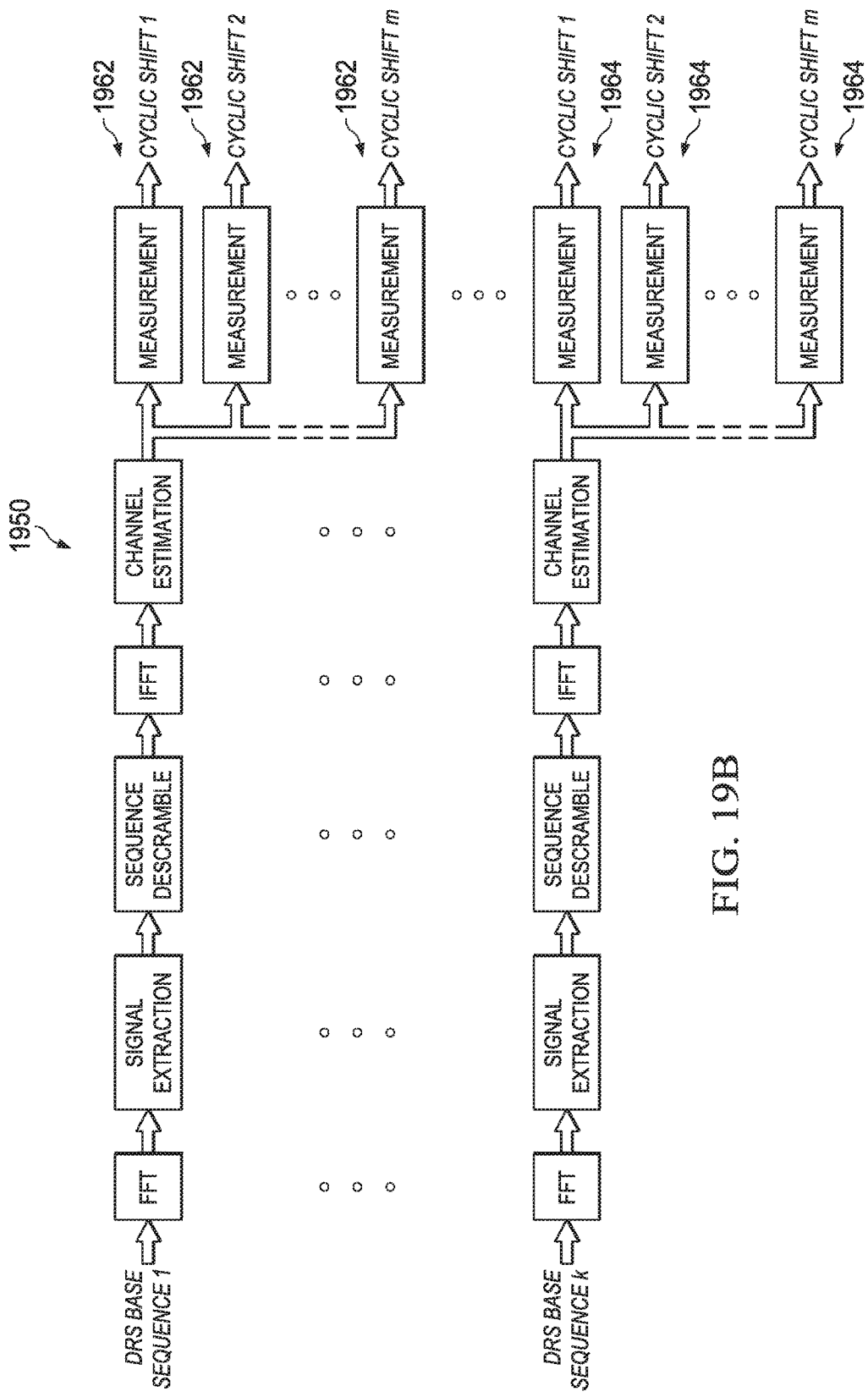
FIG. 19B illustrates an embodiment of a DRS-based measurement.

FIG. 19B illustrates an embodiment system 1950 for a DRS based measurement. The operation complexity reduction in measurement processes 1962, 1964 is roughly proportional to the number of cyclic shift configured for the small cell sharing the same base sequence.

A composite signal with each eNB transmitting with a different cyclic shift helps to perform DRS interference cancellation effectively. A UE may see several strong small cell signals in a dense deployment. Effective CRS/PSS/SSS interference cancellation generally is hard to achieve in such scenarios. A composite DRS signal from neighboring small cells sharing the same base sequence can be estimated and cancelled altogether.

Figures 20A, 20B:
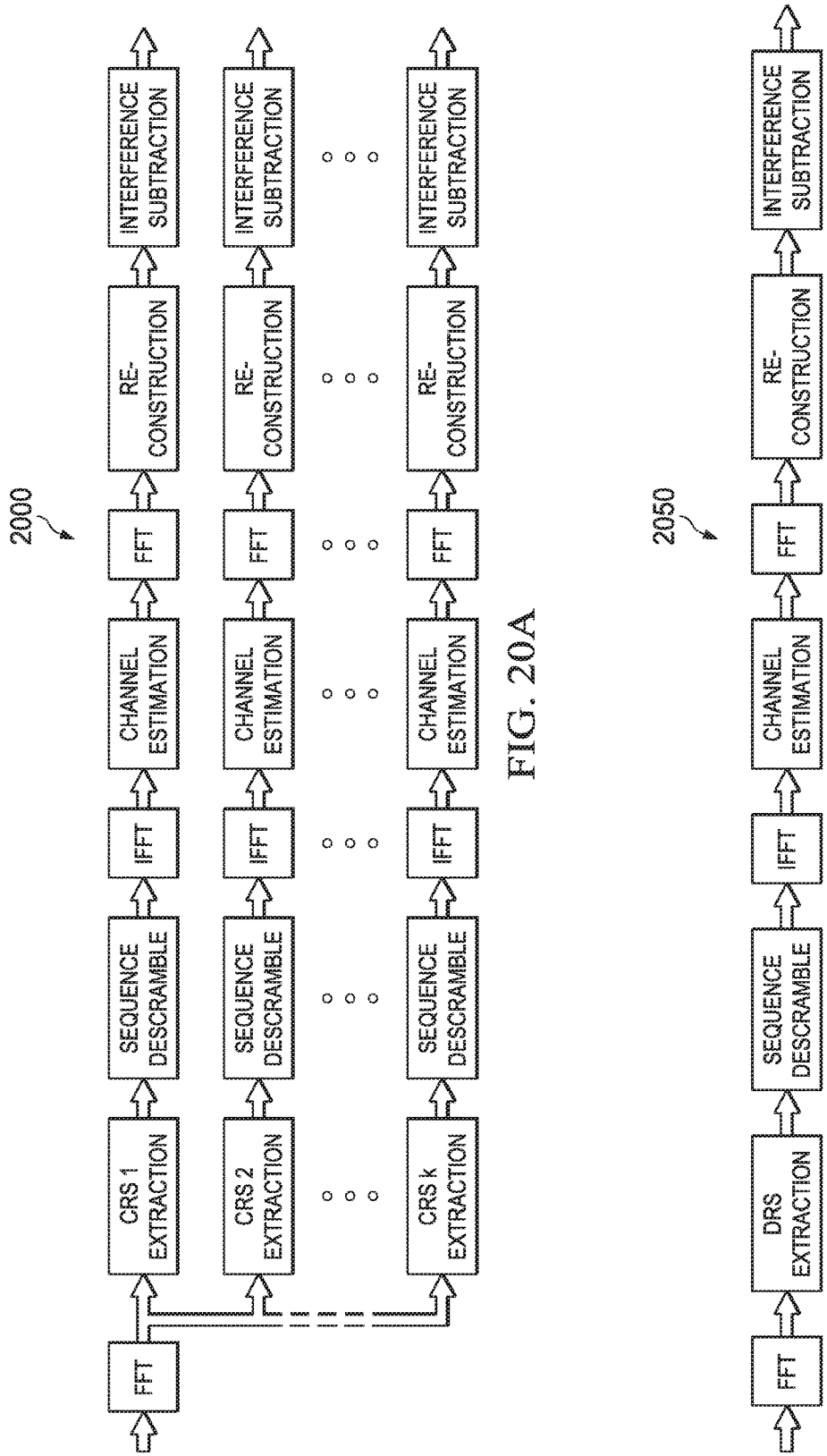
FIG. 20A illustrates an embodiment of a CRS-IC.
FIG. 20B illustrates an embodiment of a DRS-IC.

FIG. 20A illustrates an embodiment of a CRS-IC 2000, and FIG. 20B illustrates an embodiment of a DRS-IC 2050. The operation complexity reduction of DRS interference cancellation is proportional to the number of cyclic shifts configured for the small cell sharing the same base sequence.

An embodiment provides an index method for small cells within a coverage set. According to the order of the cyclic shift assigned to a small cell in a coverage set, the cell may be indexed implicitly or explicitly. In other words, the cyclic shifts may be associated with indexes such as 0, 1, . . . , and so on. Then the cell transmitting DRS with cyclic shift index 0 may be indexed within the coverage set as 0, so on and so forth. Such cell index may not be related to the cell ID of the small cell to allow the network to have high flexibility of assigning cell IDs and coverage set ID/sequence, but in some cases there may be a relation between the cell index within the coverage set and the cell ID. The embodiments may include: the cell ID is a function of the coverage set ID and the cell index, and the function may be an offset function; the cell ID may be the coverage set ID appended by the cell index, in which case the cell ID may not be one supported by the legacy carrier.

The association between the DRS and the small cells transmitting the DRS, and the association between the DRS cyclic shift and the small cells transmitting the DRS with the cyclic shift may be non-transparent or transparent to the UE. In an embodiment, a DRS with a cyclic shift is tied to a small cell in the coverage set, and the DRS signaling may not configure the cyclic shift set or the number of cyclic shifts explicitly; rather it signals the coverage set configuration or the number of cells (or DRS-transmitted cells, or total cells) in the set. In an embodiment, a DRS with a cyclic shift may be associated with a cell, or a cell's one or more antenna ports, in a quasi-co-located fashion, thus generalizing the concept of quasi-co-location used in CoMP. Such association relationship may be signaled to a UE in the DRS configuration signaling, DRS triggering signaling, or a separate signaling. One advantage of signaling such a relationship may be that the UE may connect the DRS and/or DRS based measurements with other signals/channels/measurements. For example, a small cell may be turned off for interference/traffic adaptation purposes, and it may transmit DRS for discovery purposes; with the connection between the cell and the DRS, the DRS measurements may be used by the UE for its RRM measurements, such as to shorten the needed RRM measurement duration based on CRS. However, the UE does not need to know if the DRS is transmitted from a turned-off cell or not; the UE may just need to know that the DRS is transmitted from some antennas that is quasi-co-located with a cell, thus giving the network sufficient capability to fully utilize the DRS based measurement but avoiding the need to inform the UE the cell's status. Therefore, the cell on/off may be transparent to UEs.

In an embodiment, the association of the DRS and/or the cyclic shift with cells may be unspecific for UE, nor may such an association be assumed implicitly or explicitly during the demodulation/measurement/reporting processes. The UE may report measurements associated with one or more DRSs with cyclic shifts, but the network may make the necessary connections between the measurements and cells.

Small cell on/off adaptation refers to the adaptive turning on and turning off of a small cell. When the small cell is turned on, it acts as a legacy carrier and may transmit the signals existing in a legacy carrier and signals necessary for data transmission, such as reference signals used for measurements and demodulation. When the small cell is turned off, it does not transmit any legacy carrier signals or signals necessary for data transmission. The main purpose of small cell on/off adaptation is for interference avoidance and coordination. A network may turn off certain small cells to reduce intercell interference, especially the interference caused by common channel transmissions such as CRS. Similar concepts may be applied to carrier on/off adaptation and carrier selection. The discovery signals may be transmitted from the antenna(s) of a small cell that is turned off. However, from a UE's measurement perspective, all that the UE experiences is certain discovery signals that may be associated with a small cell when it is turned on. In this sense, the small cell when turned off does not transmit anything and logically does not exist from a UE point of view even if discovery signal is transmitted from the same set of antennas.

Therefore, an embodiment method for signaling a DRS includes a first network controller signaling to a UE a resource for DRS transmissions from a set of network controllers and/or antenna ports, signaling a set of cyclic shifts or the number of total possible cyclic shifts, each cyclic shift corresponding to a respective DRS transmission by a network controller and/or antenna ports in the set of network controllers and/or antenna ports, in which such a corresponding relationship may be signaled as a quasi-colocation of DRS antenna ports with cells, and signaling reporting configuration. An embodiment method for utilizing a DRS includes a UE receiving a configuration of DRS transmissions of a set of network controllers and/or antenna ports and a reporting configuration, receiving the DRS signal, performing a measurement of the DRS transmissions, and sending a report in accordance with the measurement of the DRS transmissions, in which a measurement is associated with a cyclic shift of a DRS.

Another embodiment method for signaling a DRS includes a first network controller signaling to a UE a resource for DRS transmissions, signaling a set of cyclic shifts or the number of total possible cyclic shifts, each cyclic shift corresponding to a respective DRS measurement that may be reported, and signaling reporting configuration. An embodiment method for utilizing a DRS includes a UE receiving a configuration of DRS transmissions and a reporting configuration, receiving the DRS signal, performing a measurement of the DRS transmissions, and sending a report in accordance with the measurement of the DRS transmissions, in which a measurement is associated with a cyclic shift of a DRS.

In a multiple carrier case, the DRS may be sent from different carriers. However, the UE has to monitor multiple carriers for DRS and the cell has to transmit on multiple carriers. If the cell has turned off some or all of its carriers, it may not be desired to turn on all the carriers for DRS transmissions. One embodiment has the cell transmit on fewer carriers, or just one common carrier, and uses sequence/time/frequency to distinguish different carriers' DRSs, in intraband or interband carrier cases. In some cases, there may not even be a need to distinguish since the network may be able to compensate the pathloss differences due to carrier frequency differences.

Though the above descriptions are mainly for LTE systems, the concepts may be applicable in other systems such as HSPA systems, WiFi systems, etc.

Figure 21:
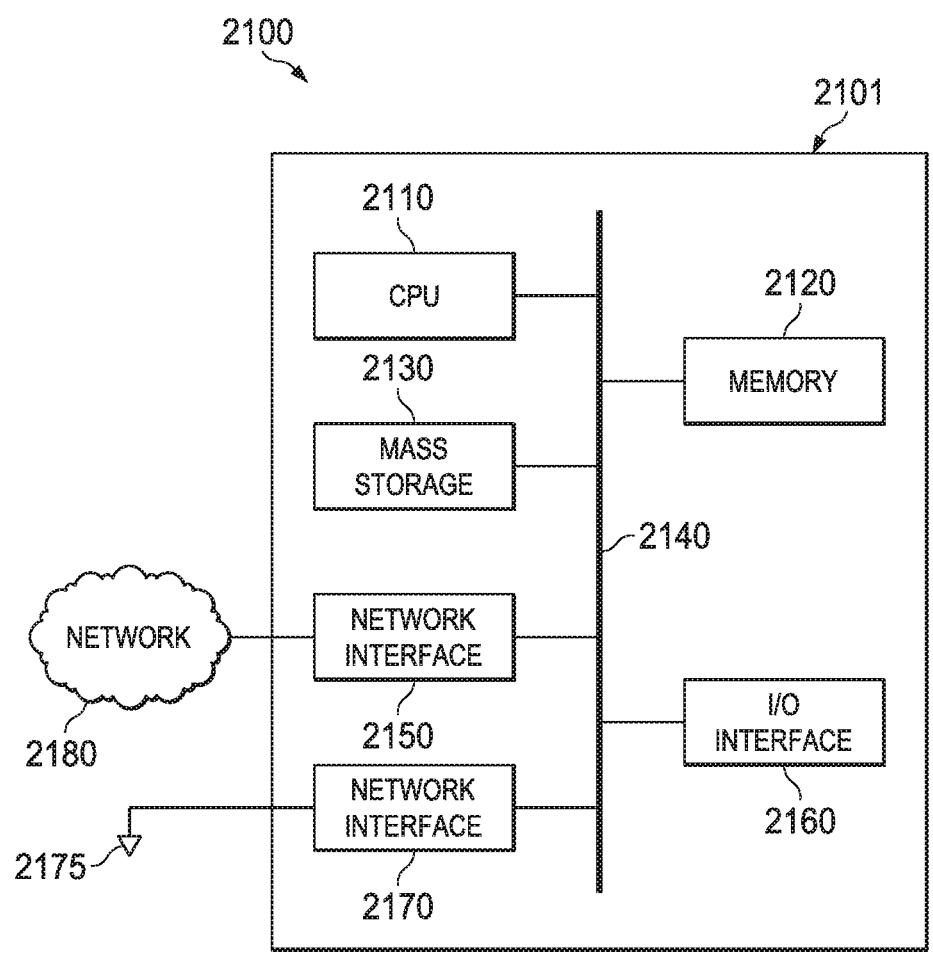
FIG. 21 illustrates a computing platform that may be used for implementing, for example, the devices and methods described herein, in accordance with an embodiment.

FIG. 21 is a block diagram of a processing system 2100 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 2100 may comprise a processing unit 2101 equipped with one or more input/output devices, such as a speaker, microphone, mouse, touchscreen, keypad, keyboard, printer, display, and the like. The processing unit 2101 may include a central processing unit (CPU) 2110, memory 2120, a mass storage device 2130, a network interface 2150, an I/O interface 2160, and an antenna circuit 2170 connected to a bus 2140. The processing unit 2101 also includes an antenna element 2175 connected to the antenna circuit.

The bus 2140 may be one or more of any type of several bus architectures including a memory bus or memory controller, a peripheral bus, video bus, or the like. The CPU 2110 may comprise any type of electronic data processor. The memory 2120 may comprise any type of system memory such as static random access memory (SRAM), dynamic random access memory (DRAM), synchronous DRAM (SDRAM), read-only memory (ROM), a combination thereof, or the like. In an embodiment, the memory 2120 may include ROM for use at boot-up, and DRAM for program and data storage for use while executing programs.

The mass storage device 2130 may comprise any type of storage device configured to store data, programs, and other information and to make the data, programs, and other information accessible via the bus 2140. The mass storage device 2130 may comprise, for example, one or more of a solid state drive, hard disk drive, a magnetic disk drive, an optical disk drive, or the like.

The I/O interface 2160 may provide interfaces to couple external input and output devices to the processing unit 2101. The I/O interface 2160 may include a video adapter. Examples of input and output devices may include a display coupled to the video adapter and a mouse/keyboard/printer coupled to the I/O interface. Other devices may be coupled to the processing unit 2101 and additional or fewer interface cards may be utilized. For example, a serial interface such as Universal Serial Bus (USB) (not shown) may be used to provide an interface for a printer.

The antenna circuit 2170 and antenna element 2175 may allow the processing unit 2101 to communicate with remote units via a network. In an embodiment, the antenna circuit 2170 and antenna element 2175 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. Additional, in some embodiments, the antenna circuit 2170 operates in Full Duplex (FD) mode. In some embodiments, the antenna circuit 2170 and antenna element 2175 may also provide Bluetooth and/or WiFi connection to other devices.

The processing unit 2101 may also include one or more network interfaces 2150, which may comprise wired links, such as an Ethernet cable or the like, and/or wireless links to access nodes or different networks. The network interface 2101 allows the processing unit 2101 to communicate with remote units via the networks 2180. For example, the network interface 2150 may provide wireless communication via one or more transmitters/transmit antennas and one or more receivers/receive antennas. In an embodiment, the processing unit 2101 is coupled to a local-area network or a wide-area network for data processing and communications with remote devices, such as other processing units, the Internet, remote storage facilities, or the like.

The following references are related to subject matter of the present application. Each of these references is incorporated herein by reference in its entirety:

3GPP LTE-RAN1 7.1.6.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method in a mobile device for communicating with a network node in a wireless cellular network, the method comprising:

receiving, at the mobile device, a parameter from a first network component on a first carrier radio resource, wherein the parameter is associated with a discovery signal (DS) burst transmitted from a second network component on a second carrier radio resource, wherein the parameter specifies at least one of a time period between successive transmissions of the DS burst, an offset within the time period, and a duration of each transmission of the DS burst; and receiving, at the mobile device, the DS from the second network component on the second carrier radio resource during a gap in successive transmissions on the first network carrier radio resource, wherein the gap is determined according to the parameter.

2. The method of claim 1, wherein timing of the gap is determined so as to avoid a time of a DS burst.

3. The method of claim 1, wherein the gap has a same periodicity and offset as the DS and a duration of the gap is longer than the DS duration, and wherein the gap completely contains the DS duration.

4. The method of claim 1, wherein the time period is at least 40 milliseconds.

5. The method of claim 1, wherein the duration is less than or equal to 5 milliseconds.

6. The method of claim 1, wherein the first network carrier radio resource overlaps with the second network carrier radio resource in a frequency domain.

7. The method of claim 1, wherein the parameter provides the mobile device with an active time frame within which the mobile device is to expect a common reference signal (CRS) from the second network component, a deactivation time frame within which the mobile device is not to expect the CRS, and information for receiving and processing the DS from the second network component.

8. The method of claim 1, wherein the DS is generated by the second network component according to a set of DS transmission parameters associated with the at least one configuration parameter.

9. The method of claim 1, further comprising refraining from performing DS based procedures when the DS is not received.

10. The method of claim 1, further comprising processing the DS according to the at least one configuration parameter.

11. The method of claim 1, wherein the time period between successive transmissions of the DS is longer than a time period between successive transmissions of a common reference signal (CRS).

12. The method of claim 1, further comprising receiving parameters associated with a DS for a third network component from the first network component and determining quasi-co-location between a set of specified antenna ports of the second network component and a set of specified antenna ports of the third network component according to the parameters that indicate the quasi-co-location between the second network component and the third network component.

13. The method of claim 12, wherein the second network component and the third network component are the same network component.

14. The method of claim 1, further comprising:
performing, by the mobile device, DS based action according to the DS and the parameters, wherein the DS based action includes at least one of synchronization, cell identification, and DS based radio resource management (RRM) measurements according to the DS; and
transmitting, by the mobile device, a report of the DS based action to the first network component.

15. The method of claim 14, wherein the synchronization and cell identification are based on primary synchronization signal (PSS) and secondary synchronization signal (SSS) of the DS, and the RRM measurements are based on one of a common reference signal (CRS) and a channel state information-reference signal (CSI-RS) of the DS.

16. A method in a network component for communicating with user equipment (UEs), the method comprising:
receiving, at the network component, a discovery signal (DS) transmission parameter wherein the DS transmission parameter specifies a time period between successive transmission of the DS and a duration of each DS transmission;
generating, by the network component, a DS according to the DS transmission parameter; and
periodically transmitting, by the network component, the DS to the UE at a period and a duration determined according to the DS transmission parameter, wherein the DS enables the UE to make radio resource management (RRM) measurements according to the DS.

17. The method of claim 16, wherein the DS is transmitted during both an off state and an on state of the network component.

18. The method of claim 16, wherein only the DS is transmitted by the network component when the network component is in the off state.

19. The method of claim 16, wherein the DS is transmitted not more frequently than once every other subframe.

20. The method of claim 16, and wherein the time period between successive transmissions of the DS is longer than a time period between successive transmissions of a common reference signal (CRS).

21. The method of claim 16, wherein the time period between successive transmissions of the DS is at least 40 milliseconds.

22. The method of claim 16, wherein the duration of the DS is less than or equal to 5 milliseconds.

23. The method of claim 16, wherein a DS duration is longer than one subframe.

24. The method of claim 16, further comprising entering the off state and suspending transmission of the CRS during inactivation states responsive to signaling from a network controller.

25. A mobile device for communicating with a network node in a wireless cellular network, comprising:
a transmitter;
a receiver;
a processor; and
a computer readable storage medium storing programming for execution by the processor, the programming including instructions for:
receiving, at the mobile device, a parameter from a first network component on a first carrier radio resource, wherein the parameter is associated with a discovery signal (DS) burst from a second network component on a second carrier radio resource, wherein the parameter specifies at least one of a time period between successive transmissions of the DS burst, an offset within the time period, and a duration of each transmission of the DS burst; and
receiving, at the mobile device, the DS from the second network component on the second carrier radio resource during a gap in successive transmissions on the first network carrier radio resource, wherein the gap is determined according to the parameter.

26. The mobile device of claim 25, wherein timing of the gap is determined so as to avoid a time of a DS burst.

27. The mobile device of claim 25, wherein the gap has a same periodicity and offset as the DS and a duration of the gap is longer than the DS duration, and wherein the gap completely contains the DS duration.

28. The mobile device of claim 25, wherein the time period is at least 40 milliseconds.

29. The mobile device of claim 25, wherein the duration is less than or equal to 5 milliseconds.

30. The mobile device of claim 25, wherein the first network carrier radio resource overlaps with the second network carrier radio resource in a frequency domain.

31. The mobile device of claim 25, wherein the parameter provides the mobile device with an active time frame within which the mobile device is to expect a common reference signal (CRS) from the second network component, a deactivation time frame within which the mobile device is not to expect the CRS, and information for receiving and processing the DS from the second network component.

32. The mobile device of claim 25, wherein the DS is generated by the second network component according to a set of DS transmission parameters associated with the at least one configuration parameter.

33. The mobile device of claim 25, wherein the programming further comprises instructions to refrain from performing DS based procedures when the DS is not received.

34. The mobile device of claim 25, wherein the programming further comprises instructions to process the DS according to the at least one configuration parameter.

35. The mobile device of claim 25, wherein the time period between successive transmissions of the DS is longer than a time period between successive transmissions of a common reference signal (CRS).

36. The mobile device of claim 25, wherein the programming further comprises instructions to receive parameters associated with a DS for a third network component from the first network component and determining quasi-co-location between a set of specified antenna ports of the second network component and a set of specified antenna ports of the third network component according to the parameters that indicate the quasi-co-location between the second network component and the third network component.

37. The mobile device of claim 25, wherein the second network component and the third network component are the same network component.

38. The mobile device of claim 25, wherein the programming further comprises instructions to:
perform a DS based action according to the DS and the parameters, wherein the DS based action includes at least one of synchronization, cell identification, and DS based radio resource management (RRM) measurements according to the DS; and
transmit a report of the DS based action to the first network component.

39. The mobile device of claim 38, wherein the synchronization and cell identification are based on primary synchronization signal (PSS) and secondary synchronization signal (SSS) of the DS, and the RRM measurements are based on one of a common reference signal (CRS) and a channel state information-reference signal (CSI-RS) of the DS.

40. A network component configured communicating with user equipment (UEs), comprising:
a transmitter;
a receiver;
a processor; and
a computer readable storage medium storing programming for execution by the processor, the programming including instructions for:
receiving, at the network component, a discovery signal (DS) transmission parameter wherein the DS transmission parameter specifies a time period between successive transmission of the DS and a duration of each DS transmission;
generating, by the network component, a DS according to the DS transmission parameter; and
periodically transmitting, by the network component, the DS to the UE at a period and a duration determined according to the DS transmission parameter, wherein the DS enables the UE to make radio resource management (RRM) measurements according to the DS.

41. The network component of claim 40, wherein the DS is transmitted during both an off state and an on state of the network component.

42. The network component of claim 40, wherein only the DS is transmitted by the network component when the network component is in the off state.

43. The network component of claim 40, wherein the DS is transmitted not more frequently than once every other subframe.

44. The network component of claim 40, and wherein the time period between successive transmissions of the DS is longer than a time period between successive transmissions of a common reference signal (CRS).

45. The network component of claim 40, wherein the time period between successive transmissions of the DS is at least 40 milliseconds.

46. The network component of claim 40, wherein a duration of the DS is less than or equal to 5 milliseconds.

47. The network component of claim 40, wherein the DS duration is longer than sub-frames.

48. The network component of claim 40, wherein the programming further comprises instructions to enter the off state and suspend transmission of the CRS during inactivation states responsive to signaling from a network controller.

* * * * *